US008784982B2

(12) United States Patent
Pearce et al.

(10) Patent No.: US 8,784,982 B2
(45) Date of Patent: Jul. 22, 2014

(54) CUSHIONING ELEMENTS COMPRISING ELASTOMERIC MATERIAL AND METHODS OF FORMING SAME

(75) Inventors: Tony M. Pearce, Alpine, UT (US); Russell B. Whatcott, Eagle Mountain, UT (US)

(73) Assignee: Edizone, LLC, Alpine, UT (US)

( * ) Notice: Subject to any disclaimer, the term of this patent is extended or adjusted under 35 U.S.C. 154(b) by 63 days.

(21) Appl. No.: 13/454,874

(22) Filed: Apr. 24, 2012

(65) Prior Publication Data

US 2012/0276339 A1    Nov. 1, 2012

Related U.S. Application Data

(60) Provisional application No. 61/517,872, filed on Apr. 27, 2011, provisional application No. 61/627,612, filed on Oct. 14, 2011.

(51) Int. Cl.
*B32B 5/28* (2006.01)
*B05D 5/00* (2006.01)

(52) U.S. Cl.
USPC .................. 428/308.4; 428/318.4; 428/319.3; 428/160; 428/323; 427/244; 427/508; 427/230

(58) Field of Classification Search
USPC ............. 428/308.4, 319.3, 319.7, 160, 318.4, 428/323; 427/244, 408, 230
See application file for complete search history.

(56) References Cited

U.S. PATENT DOCUMENTS

| | | | |
|---|---|---|---|
| 4,369,284 A | 1/1983 | Chen | |
| 4,588,629 A * | 5/1986 | Taylor | ............................. 428/88 |
| 5,114,773 A * | 5/1992 | Bogdany | ......................... 428/95 |
| 5,633,286 A | 5/1997 | Chen | |
| 5,994,450 A | 11/1999 | Pearce | |
| 6,270,836 B1 * | 8/2001 | Holman | ..................... 427/126.3 |
| 7,964,664 B2 | 6/2011 | Pearce | |
| 8,337,980 B2 * | 12/2012 | Hubbs | ......................... 428/308.4 |
| 2006/0277788 A1 | 12/2006 | Fujii | |
| 2011/0028639 A1 * | 2/2011 | Knepper et al. | .............. 524/588 |

FOREIGN PATENT DOCUMENTS

| | | |
|---|---|---|
| JP | 2004-162204 | 6/2004 |
| JP | 2010-023504 | 2/2010 |
| WO | WO 2006127533 A1 * | 11/2006 |

OTHER PUBLICATIONS

PCT International Search Report and Written Opinion of the International Searching Authority for PCT/US2012034815, dated Nov. 20, 2012, 10 pages.

* cited by examiner

*Primary Examiner* — Hai Vo
(74) *Attorney, Agent, or Firm* — TraskBritt

(57) ABSTRACT

Cushioning elements include a porous foam comprising a series of interconnected cell walls and an elastomeric material formed over at least a portion of the interconnected cell walls. The porous foam is configured to allow gases to pass through at least a portion thereof. Methods of forming cushioning elements may include coating interconnected cell walls of a breathable porous foam with a liquid comprising an elastomeric material, solidifying at least a portion of the elastomeric material, and providing a gas path through the elastomeric material. Other methods include pressing sheets of foam together at a pinch point, disposing a liquid between the foam over the pinch point, coating the foam with the liquid, and separating the sheets beyond the pinch point. Some methods include consolidating a plurality of portions of porous foam into a continuous cushioning material.

23 Claims, 9 Drawing Sheets

CUSHIONING ELEMENTS COMPRISING ELASTOMERIC MATERIAL AND METHODS OF FORMING SAME

CROSS-REFERENCE TO RELATED APPLICATIONS

This application claims the benefit of U.S. Provisional Patent Application Ser. No. 61/517,872, filed Apr. 27, 2011, and entitled "Breathable Elastomer-Coated Open-Cell Flexible Foam," and U.S. Provisional Patent Application Ser. No. 61/627,612, filed Oct. 14, 2011, and entitled "Breathable Elastomer-Coated Open-Cell Flexible Foam," the disclosures of each of which are incorporated herein by reference in their entirety.

FIELD

Embodiments of the disclosure relate generally to cushioning elements, to products including cushioning elements, and to methods of making and using cushioning elements.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

For example, cushioning materials may include a foam layer topped with a layer of thermoset elastomeric gel, such as a polyurethane gel or a silicone gel. Because polyurethane gels and silicone gels are generally structurally weak and/or sticky, cushioning materials may include film covering such gels, such as a thin thermoplastic polyurethane film. The film may reinforce the strength of the gel, and may prevent other materials from sticking to the gel, since the film generally adheres to the gel but is not itself sticky.

Gels may be used for cushioning and/or temperature management. Gels may provide cushioning because the gels may hydrostatically flow to the shape of a cushioned object and may tend to relieve pressure peaks. Gels may also reduce stresses from shear. Gels may have high thermal mass and/or thermal conductivity, and may therefore be used for heating (such as in hot packs for sore muscles), cooling (such as in cold packs for sprains or for a feeling of coolness when lying on a mattress or pillow), or maintaining a given temperature (such as in a mattress being used in a warm or cool room). For example, gel may be fused to the top of a mattress core, and a film may cover the gel. As another example, gels may be used as the top layer of a gel-on-foam wheelchair cushion.

A conventional gel layer, with or without a plastic film, may be a barrier to gases (e.g., air, vapors, or other gases). This barrier may cause difficulties such as discomfort, such as when body heat and/or perspiration accumulate between the user's body and the gel layer. Even when a breathable material (such as a cover comprising foam or batting fiber) is disposed between a cushioned object and the gel, gases can only travel laterally through the breathable material. Since gases cannot penetrate the plastic film or the gel, the plastic film or the gel inhibits the flow of the gases away from the cushioned object. When the weight of the cushioned object compresses the breathable material, the lateral gas flow paths may become more constricted. Thus, it would be beneficial to provide a cushioning material that alleviates some of these concerns.

BRIEF SUMMARY

In some embodiments, a cushioning element includes a porous foam comprising a series of interconnected cell walls and an elastomeric material formed over at least a portion of the interconnected cell walls. The elastomeric material includes an elastomeric polymer and a plasticizer. A ratio of a weight of the plasticizer to a weight of the elastomeric polymer is from about 0.1 to about 50. The porous foam is configured to allow gases to pass through at least a portion thereof.

Methods of forming cushioning elements may include coating interconnected cell walls of a breathable porous foam with a liquid comprising an elastomeric material, solidifying at least a portion of the elastomeric material, and providing a gas path through the elastomeric material. The interconnected cell walls form an open pore network configured to allow gases to flow therethrough. The elastomeric material is adjacent the open pore network of the breathable porous foam.

In some embodiments, a method of forming a cushioning element includes pressing two sheets of breathable porous foam together at a pinch point, disposing a liquid between the two sheets of breathable porous foam over the pinch point, coating at least a portion of each of the two sheets of breathable porous foam with the liquid, and separating the two sheets of breathable porous foam beyond the pinch point.

BRIEF DESCRIPTION OF THE DRAWINGS

While the specification concludes with claims particularly pointing out and distinctly claiming that which are regarded as embodiments of the present disclosure, various features and advantages may be more readily ascertained from the following description of example embodiments of the disclosure provided with reference to the accompanying drawings, in which:

DETAILED DESCRIPTION

Figure 1:
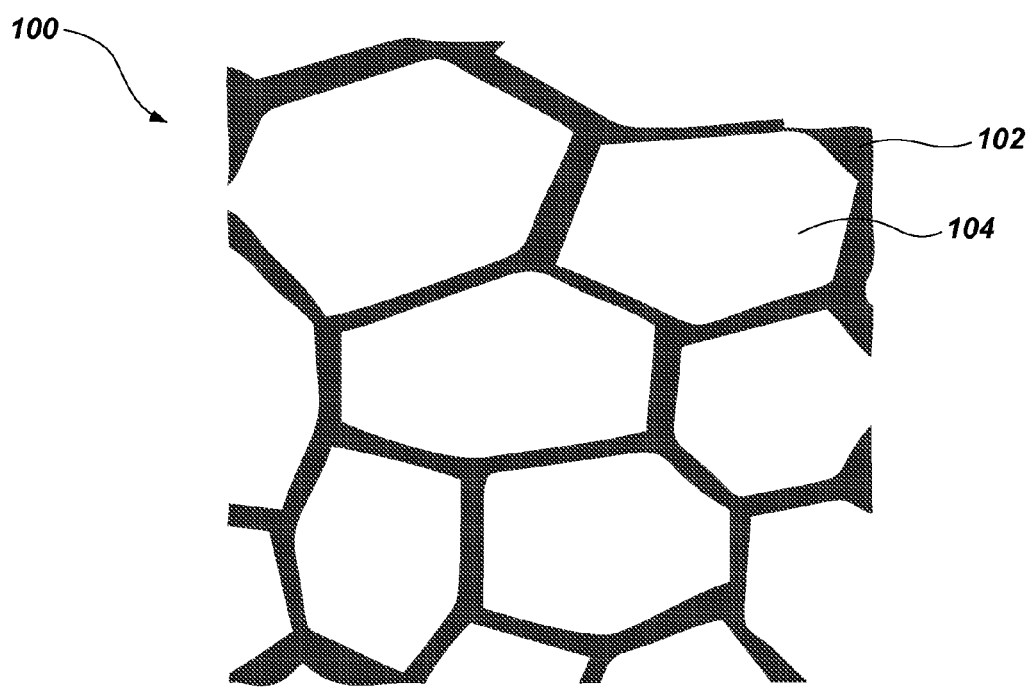
FIG. 1 is a simplified cross section of open-cell flexible foam.

As used herein, the term "cushioning element" means and includes any deformable device intended for use in cushioning one body relative to another. As a non-limiting example, cushioning elements (e.g., seat cushions) include materials intended for use in cushioning the body of a person relative to another object that might otherwise abut against the body of the person.

As used herein, the term "breathable" means configured to allow gases (e.g., air and vapors, such as water vapor) to pass through. A breathable material may be a fabric, a porous foam, or another material having gas passageways.

As used herein, the term "elastomeric polymer" means and includes a polymer capable of recovering its original size and shape after deformation. In other words, an elastomeric polymer is a polymer having elastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include materials referred to in the art as "elastomer gels," "gelatinous elastomers," or simply "gels."

As used herein, the term "liquid comprising an elastomeric material", or the term "liquid" if in the context of a coating that will form an elastomeric material, means a liquid material that comprises elastomeric polymers that can be transformed into a solid elastomeric material. One example is a molten liquid mixture of thermoplastic elastomer (e.g., KRATON® G1651) and plasticizer (e.g., mineral oil) that upon cooling is transformed into a solid gelatinous elastomer. Another example is a solvated liquid mixture of thermoplastic elastomer (e.g., KRATON® G1651), plasticizer (e.g., mineral oil) and solvent (e.g., toluene), which upon evaporation of the solvent is transformed into a solid gelatinous elastomer. Another example is a not-yet-fully-reacted liquid mixture of the precursor components of a thermoset gel (e.g., a polyurethane gel, a silicone gel, or a PVC plastisol) which upon the passage of time, upon application of heat, and/or upon application of UV radiation is transformed into a solid gelatinous elastomer.

The illustrations presented herein are not actual views of any particular material or device, but are merely idealized representations employed to describe embodiments of the present disclosure. Elements common between figures may retain the same numerical designation.

Cushioning elements having a porous foam including a series of interconnected cell walls defining voids that form an open-cell structure are disclosed herein. An elastomeric material may be formed over at least a portion of the interconnected cell walls, and the cushioning element may remain porous, such that gases may pass through the cushioning element. That is, the cell structure of a breathable open-cell flexible foam may be coated with an elastomer, yet remain breathable and flexible, retaining an open-cell structure.

Figure 2:
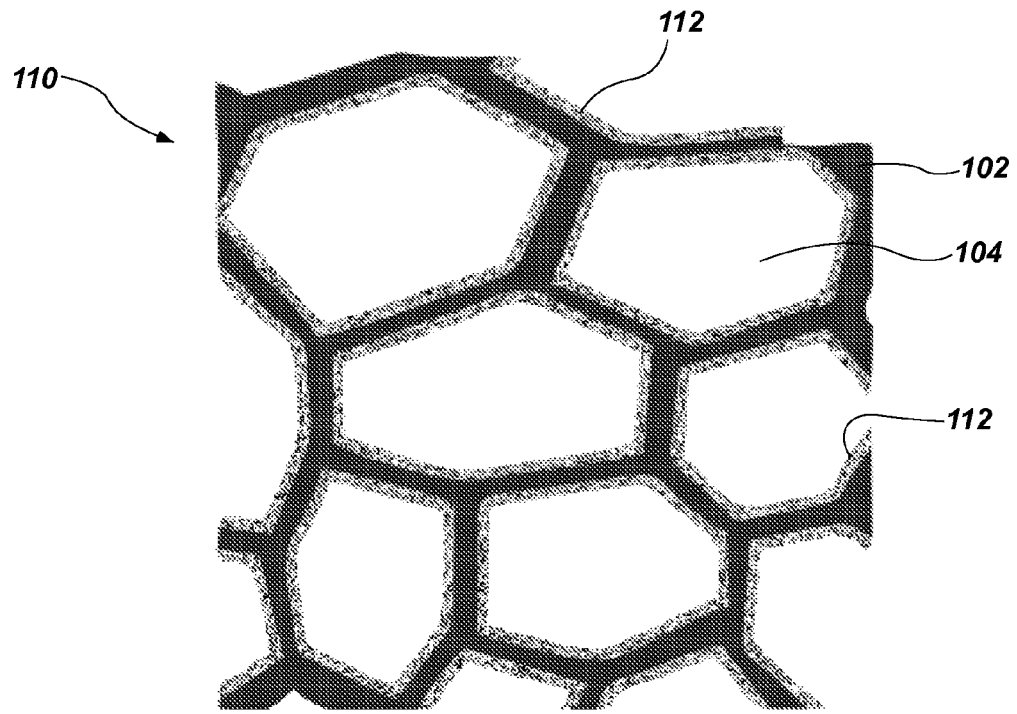
FIG. 2 is a simplified cross section of open-cell flexible foam coated with an elastomeric material.

For example, FIGS. 1 and 2 show simplified cross-sectional views of cushioning materials 100 and 110. The cushioning materials 100, 110 each include a porous foam, having interconnected cell walls 102. The porous foam may include one or more material having a breathable open-cell structure. The porous foam may be a natural or synthetic material having an open pore network (i.e., having interconnected pores), such that gases (e.g., air, water vapor, etc.) or liquids may pass through the porous foam. Passage of gases through voids 104 may allow the material to "breathe." The cell walls 102 of the porous foam may define a plurality of voids 104 extending continuously through the porous foam. In some embodiments, the plurality of voids 104 may have an average dimension (e.g., an average diameter, an average width, etc.) of at least about 0.01 mm (about 0.0004 in), at least about 0.1 mm (about 0.004 in), at least about 1.0 mm (about 0.04 in), or at least about 10 mm (about 0.4 in). The cell walls 102 may also define a smaller plurality of voids (not shown) that may or may not extend through the porous foam.

The porous foam may be flexible, such that when an object or body exerts a force on the porous foam, the porous foam deforms to at least partially conform to the object or body. Flexible materials are commonly used for cushioning because a material that conforms to the shape of an object or body may provide support over a greater surface area than a rigid support member. Peak pressures acting on the object or body may therefore be lower, since total force is the product of pressure and the area over which the pressure is applied. Lower pressure may correspond to a more comfortable support or a lower likelihood of damage.

In some embodiments, the porous foam may include one or more of a polyurethane or latex rubber. For example, the porous foam may include polyurethane foam, polyurethane memory foam, natural latex foam rubber, synthetic latex foam rubber, a foamed blend of natural and synthetic rubbers, or foamed polyolefin (e.g., foamed polyethylene).

The cushioning material 110 shown in FIG. 2 includes an elastomeric material 112 formed over at least a portion of the cell walls 102. For example, the elastomeric material 112 may be infiltrated into the cushioning material 110, coated on the cell walls 102 of the cushioning material 110, interposed within the voids 104 of the cushioning material 110, etc. In some embodiments, the elastomeric material 112 may partially or fully encapsulate the cell walls 102 of the cushioning material 110 or a portion thereof. Elastomeric materials are described in, for example, U.S. Pat. No. 5,994,450, issued Nov. 30, 1999, and entitled "Gelatinous Elastomer and Methods of Making and Using the Same and Articles Made Therefrom;" U.S. Pat. No. 7,964,664, issued Jun. 21, 2011, and entitled "Gel with Wide Distribution of MW in Mid-Block;" and U.S. Pat. No. 4,369,284, issued Jan. 18, 1983, and entitled "Thermoplastic elastomer gelatinous compositions;" the disclosures of each of which are incorporated herein in their entirety by this reference. The elastomeric material 112 may include an elastomeric polymer and a plasticizer. The elastomeric material 112 may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® G1650, and KRATON® G1651. In these examples, the "A" blocks are styrene. The "B" block may be rubber (e.g., butadiene, isoprene. etc.) or hydrogenated rubber (e.g., ethylene/propylene or ethylene/butylene or ethylene/ethylene/propylene) capable of being plasticized with mineral oil or other hydrocarbon fluids. The elastomeric material 112 may comprise elastomeric polymers other than styrene-based copolymers, such as non-styrenic elastomeric polymers that are thermoplastic in nature or that can be solvated by plasticizers or that are multi-component thermoset elastomers.

The elastomeric material 112 may include one or more plasticizers, such as hydrocarbon fluids. For example, elastomeric materials may comprise aromatic-free food-grade white paraffinic mineral oils, such as those sold by Sonneborn, Inc., of Mahwah, N.J., under the trade names BLANDOL® and CARNATION®.

In some embodiments, the elastomeric material 112 may have a plasticizer-to-polymer ratio from about 0.1:1 to about 50:1 by weight. For example, elastomeric materials 112 may have plasticizer-to-polymer ratios from about 2:1 to about 30:1 by weight, or even from about 5:1 to about 15:1 by weight. In further embodiments, elastomeric materials 112 may have plasticizer-to-polymer ratios of about 8:1 by weight or about 9:1 by weight.

The elastomeric material 112 may have one or more fillers (e.g., lightweight microspheres). Fillers may affect thermal properties, density, processing, etc. of the elastomeric material 112. For example, hollow microspheres (e.g., hollow glass microspheres or hollow acrylic microspheres) may decrease the thermal conductivity of the elastomeric material 112 by acting as an insulator. As another example, metal particles (e.g., aluminum, copper, etc.) may increase the thermal conductivity of the resulting elastomeric material 112. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change).

The elastomeric material 112 may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl)propionate), commercially available as IRGANOX® 1010, from BASF Corp., of Iselin, N.J. or as EVERNOX®-10, from Everspring Chemical, of Taichung, Taiwan; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl) phosphite, commercially available as IRGAFOS® 168, from BASF Corp or as EVERFOS® 168, from Everspring Chemical. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The elastomeric material 112 may comprise up to about 5 wt % antioxidants. For instance, the elastomeric material 112 may comprise from about 0.10 wt % to about 1.0% antioxidants.

In some embodiments, the elastomeric material 112 may include a resin. The resin may be selected to modify the elastomeric material 112 to slow a rebound of the cushioning materials 100 and 110 after deformation. The resin, if present, may include a hydrogenated pure monomer hydrocarbon resin, such as those commercially available from Eastman Chemical Company, of Kingsport, Tenn., under the trade name REGALREZ®. The resin, if present, may function as a tackifier, increasing the stickiness of a surface of the elastomeric material 112.

In some embodiments, the elastomeric material 112 may include a pigment or a combination of pigments. Pigments may be aesthetic and/or functional. That is, pigments may provide a cushioning material 110 with an appearance appealing to consumers. In addition, a cushioning material 110 having a dark color may absorb radiation differently than a cushioning material 110 having a light color.

The elastomeric material 112 may include any type of gelatinous elastomer. For example, the elastomeric material 112 may include a melt-blend of one part by weight of a styrene-ethylene-ethylene-propylene-styrene (SEEPS) elastomeric triblock copolymer (e.g., SEPTON® 4055, available from Kuraray America, Inc.) with eight parts by weight of a 70-weight straight-cut white paraffinic mineral oil (e.g., CARNATION® White Mineral Oil, available from Sonneborn, Inc.) and, optionally, pigments, anti-oxidants, and/or other additives.

The elastomeric material 112 may have properties that contribute to or enhance one or more selected properties of the cushioning material 110. For example, the elastomeric material 112 may be more supportive than a cushioning material 100 having similar cell walls 102 and voids 104, but without the elastomeric material 112. For example, resistance to shear forces may be decreased by the addition of the coating of elastomeric material.

The elastomeric material 112 may change thermal properties of the cushioning material 110 as compared to the cushioning material 100. For example, the elastomeric material 112 may have a different thermal conductivity and/or heat capacity than the material forming the cell walls 102. Heating, cooling, and other temperature management may be a beneficial feature of cushioning materials 110 including an elastomeric material 112.

The elastomeric material 112 may have a different heat capacity and/or thermal conductivity than foams, other cushioning materials, and/or other temperature management materials. For example, the heat capacity and/or thermal conductivity of the elastomeric material 112 may be higher or lower than the heat capacity and/or thermal conductivity of the cushioning material 110.

Elastomeric materials 112 may optionally include fillers (e.g., lightweight microspheres), which may affect thermal properties. For example, hollow microspheres may decrease the thermal conductivity of the elastomeric material 112 by acting as an insulator because such hollow microspheres (e.g., hollow glass microspheres or hollow acrylic microspheres) may have lower thermal conductivity than the plasticizer, the polymer, and/or the material of the cell walls 102. As another example, metal particles (e.g., aluminum, copper, etc.) may increase the thermal conductivity of the resulting material because such particles may have greater thermal conductivity than the plasticizer and/or polymer of the elastomeric material 112 and/or the material of the cell walls 102. As another example, microspheres filled with wax or another phase-change material (i.e., a material formulated to undergo a phase change near a temperature at which a cushioning material may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material 112 may include a material that returns to its original shape after deformation, and that may be elastically stretched. The elastomeric material 112 may be rubbery in feel, but may deform to the shape of an object applying a deforming pressure better than conventional rubber materials, and may have a durometer hardness lower than conventional rubber materials. For example, the elastomeric material 112 may have a hardness on the Shore A scale of less than about 50, from about 0.1 to about 50, or less than about 1.

The elastomeric material 112 may be generally nonsticky, such that the voids 104 may return to their original shape after a load is removed from the cushioning material 110. That is, the elastomeric material 112 may be sufficiently nonsticky that a void 104 returns to its original shape after a deforming force is removed. That is, any contact between the elastomeric material 112 of opposite sides of the void 104 may cease once the force is removed. The cushioning material 110 may promote a return to an original shape upon removal of a load. The elastomeric material 112 may be formulated to have any selected stickiness or tackiness, such as to control the rate of response to removal of a load.

Figure 3:
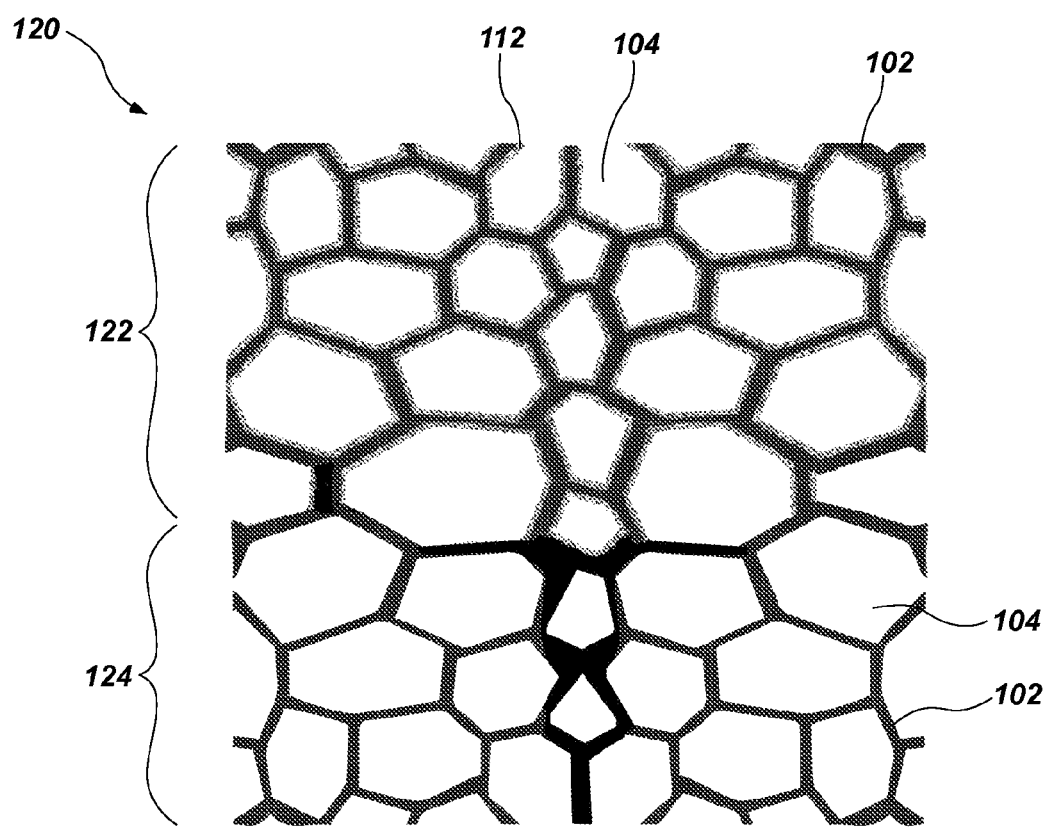
FIG. 3 is a simplified cross section of open-cell flexible foam, in which a portion of the open-cell flexible foam is coated with an elastomeric material.

The elastomeric material 112 may cover all or a portion of the cell walls 102. For example, FIG. 3 shows a cushioning material 120 having a coated portion 122 and an uncoated portion 124. The coated portion 122 may have a configuration similar to the cushioning material 110 shown in FIG. 2. The uncoated portion 124 may have a configuration similar to the cushioning material 100 shown in FIG. 1. Both the coated portion 122 and the uncoated portion 124 may include a porous foam, having interconnected cell walls 102. Though the coated portion 122 may have an elastomeric material 112 disposed over the cell walls 102, interconnected passageways may remain through both the coated portion 122 and the uncoated portion 124. That is, gases or liquids may pass through the cushioning material 120, including through the coated portion 122 and the uncoated portion 124. The coated portion 122 of the cushioning element 120 may have an approximately uniform thickness t. In some embodiments, the thickness t of the coated portion 122 may be from about 1.3 mm (about 0.05 in) to about 76 mm (about 3 in), or from about 2.5 mm (about 0.1 in) to about 25 mm (about 1 in). For example, the thickness t of the coated portion 122 may be about 3.2 mm (about 0.125 in). The thickness t may be selected for its effect on cushioning, breathability, mass, material cost, ease of manufacturing, etc.

Figure 4:
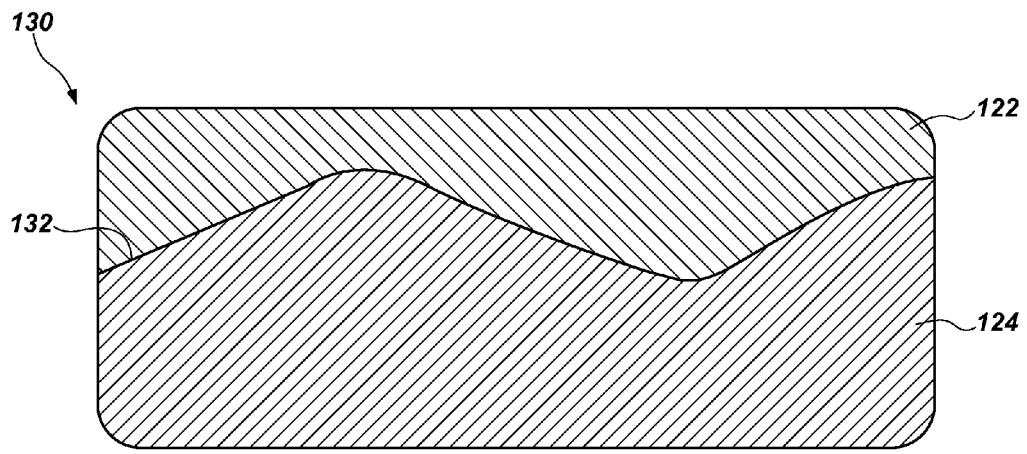
FIGS. 4 and 5 are simplified cross sections of cushions including open-cell flexible foam.
Figure 5:
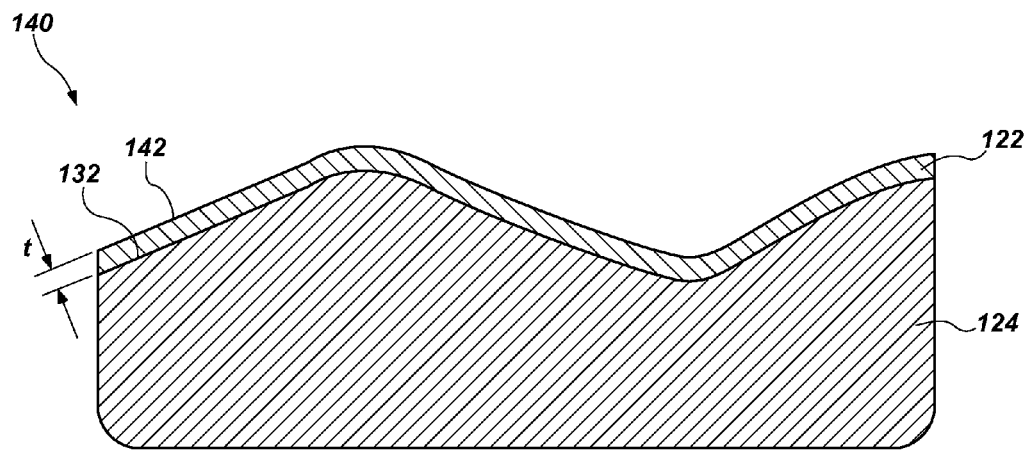

FIGS. 4 and 5 show cushioning elements 130 and 140 having a coated portion 122 and an uncoated portion 124. In the cushioning element 130 of FIG. 4, a boundary 132 between the coated portion 122 and the uncoated portion 124 has a convoluted surface (e.g., a surface having a shape similar to convoluted (egg-crate) foam). A cross section of the boundary 132 may be shaped approximately as a sine wave. The cushioning element 140 of FIG. 5 has a convoluted top surface 142. The coated portion 122 of the cushioning element 140 may have an approximately uniform thickness t over a convoluted uncoated portion 124. In some embodiments, the thickness t of the coated portion 122 may be from about 1.3 mm (about 0.05 in) to about 76 mm (about 3 in), or from about 2.5 mm (about 0.1 in) to about 25 mm (about 1 in). For example, the thickness t of the coated portion 122 may be about 3.2 mm (about 0.125 in). The thickness t may be selected for its effect on cushioning, breathability, mass, material cost, ease of manufacturing, etc. In some embodiments, the thickness t may vary based on the thickness of the foam to which the elastomeric material 112 is applied. For example, when the elastomeric material 112 is applied to convoluted foam, the thickness t of the coated portion 122 may be greater at the peaks than at the valleys of the convoluted foam. Alternatively, the thickness t of the coated portion 122 may be greater at the valleys than at the peaks of the convoluted foam.

Figure 6:
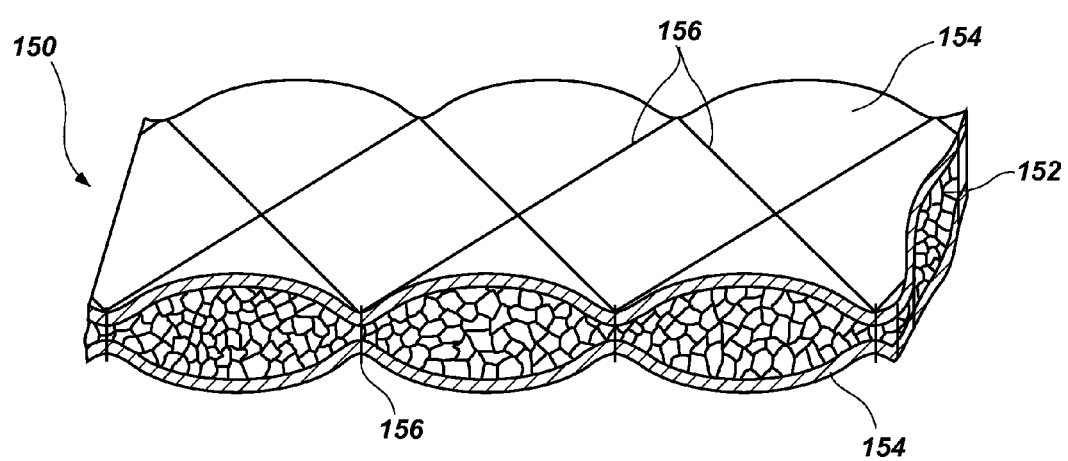
FIG. 6 is a simplified perspective of a cushions including open-cell flexible foam.

FIG. 6 shows another cushioning element 150, having a cushioning material 152 between covers 154. The cushioning material 152 may include a porous foam having an elastomeric material formed over at least a portion of cell walls, such as the cushioning materials 110, 120, described above. The covers 154 may be distinct materials, or may be a single continuous material (e.g., a single cover 154 may partially or entirely encapsulate the cushioning material 152). The covers 154 may be quilted together and/or to the cushioning material 152, such as by fibers 156. Though FIG. 6 shows a cushioning element 150 having two covers 154 on opposite sides of the cushioning material 152, the cushioning element 150 may alternatively have one cover 154 on one side of the cushioning material 152, without a cover 154 on the opposite side. The single cover 154 may be quilted to the cushioning material 152 by fibers 156.

Methods of forming cushioning materials and cushioning elements as described herein include coating interconnected cell walls 102 (see FIGS. 1 through 3) of a porous foam with an elastomeric material 112, and providing a gas path through the porous foam. Such methods may be well suited to continuous production, but may also be performed on any individual cushioning material.

In some embodiments, the elastomeric material 112 or a precursor thereof may be mixed with an open-cell foam precursor before or during the formation of an open-cell structure. The foam structure of the material may be formed, such as by reaction of the precursor to form cell walls 102 and voids 104 or by blowing a gas through the precursor. The elastomeric material 112 may remain coated on the cell walls 102, and gas passageways may form within and through the foam material (e.g., adjacent the elastomeric material 112 coating the cell walls 102).

In some embodiments, the elastomeric material 112 may be coated on cell walls 102 after the open-cell structure of the foam material has been formed. For example, the elastomeric material 112 may be coated on conventional polyurethane foam, viscoelastic polyurethane foam, reticulated polyurethane foam, latex foam rubber, or any other type of open-cell flexible foam. The elastomeric material 112 may be disposed within the voids 104, such as by pouring a liquid elastomeric material 112 over the foam material. The voids 104 may be filled or partially filled with the elastomeric material 112. A portion of the elastomeric material 112 may subsequently be removed from the voids 104, leaving a coating over some or all of the cell walls 102.

For example, a liquid elastomeric material may be disposed over a porous foam cushioning material (e.g., the cushioning material 100 shown in FIG. 1). A vacuum may be applied to the cushioning material, such as to a surface opposite the liquid elastomeric material. For example, the cushioning material may be disposed over a vacuum table, which may cause air to flow downward through the foam. A pressure differential may compress or squeeze the porous foam and/or cause the elastomeric material to enter the voids of the porous foam, filling the voids and/or coating the cell walls. Vacuum may subsequently be released, causing the porous foam to return approximately to its original size. The elastomeric material or a portion thereof may remain within the porous foam as a coating on the cell walls. In some embodiments, pressure may be applied to the elastomeric material to promote movement of the elastomeric material into the porous foam. Pressure may be applied instead of vacuum, or in alternating sequence with vacuum.

In some embodiments, an elastomeric material may be mixed with a solvent, and the mixture may be applied to the cushioning material. For example, the elastomeric material may be dispersed or dissolved in a volatile solvent that does not dissolve the cushioning material. The solvent may be selected for its ability to carry the elastomeric material into the voids of the cushioning material, then to be removed, such as by evaporation. Suitable solvents may be selected based on the composition of the elastomeric material and/or the composition of the cushioning material. For example, toluene may be used as a solvent for an elastomeric material comprising an A-B-A triblock copolymer (e.g., KRATON® G1651 of SEPTON® 4055). The mixture of the elastomeric material with the solvent may be transferred into the cushioning material, coating the cell walls of the porous foam. The solvent may be removed, such as by heating and/or applying a vacuum to the cushioning material. Removal of the solvent may leave a coating of the elastomeric material on the cell walls that is thinner than a coating that could be produced without mixing a solvent with the elastomeric material.

In some embodiments, a porous foam may be soaked with elastomeric material and, subsequently pressed by a mechanical force. The mechanical force may compress or squeeze the voids of the porous foam, allowing the elastomeric material to pass through all or a portion of the porous foam. The mechanical force may also remove excess elastomeric material from the porous foam, such that when the mechanical force is removed, a coating of the elastomeric material remains on the cell walls of the porous foam, with a gas path through the porous foam. For example, the mechanical force may be applied by one or more rollers, and the rollers may apply a pressing force as the porous foam passes adjacent the rollers. In some embodiments, the porous foam may be pressed between two opposing rollers.

Figure 7:
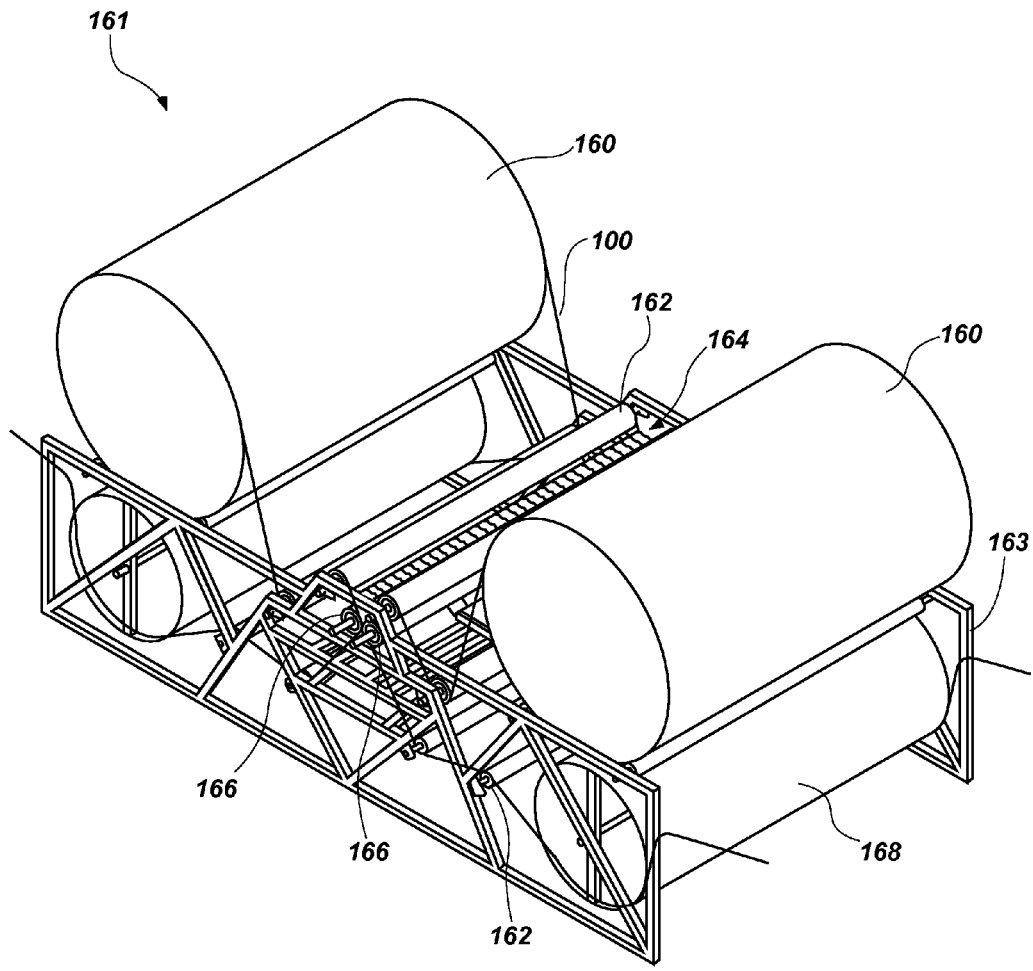
FIG. 7 is a simplified perspective view of a machine for forming elastomer-coated open-cell flexible foam.
Figure 8:
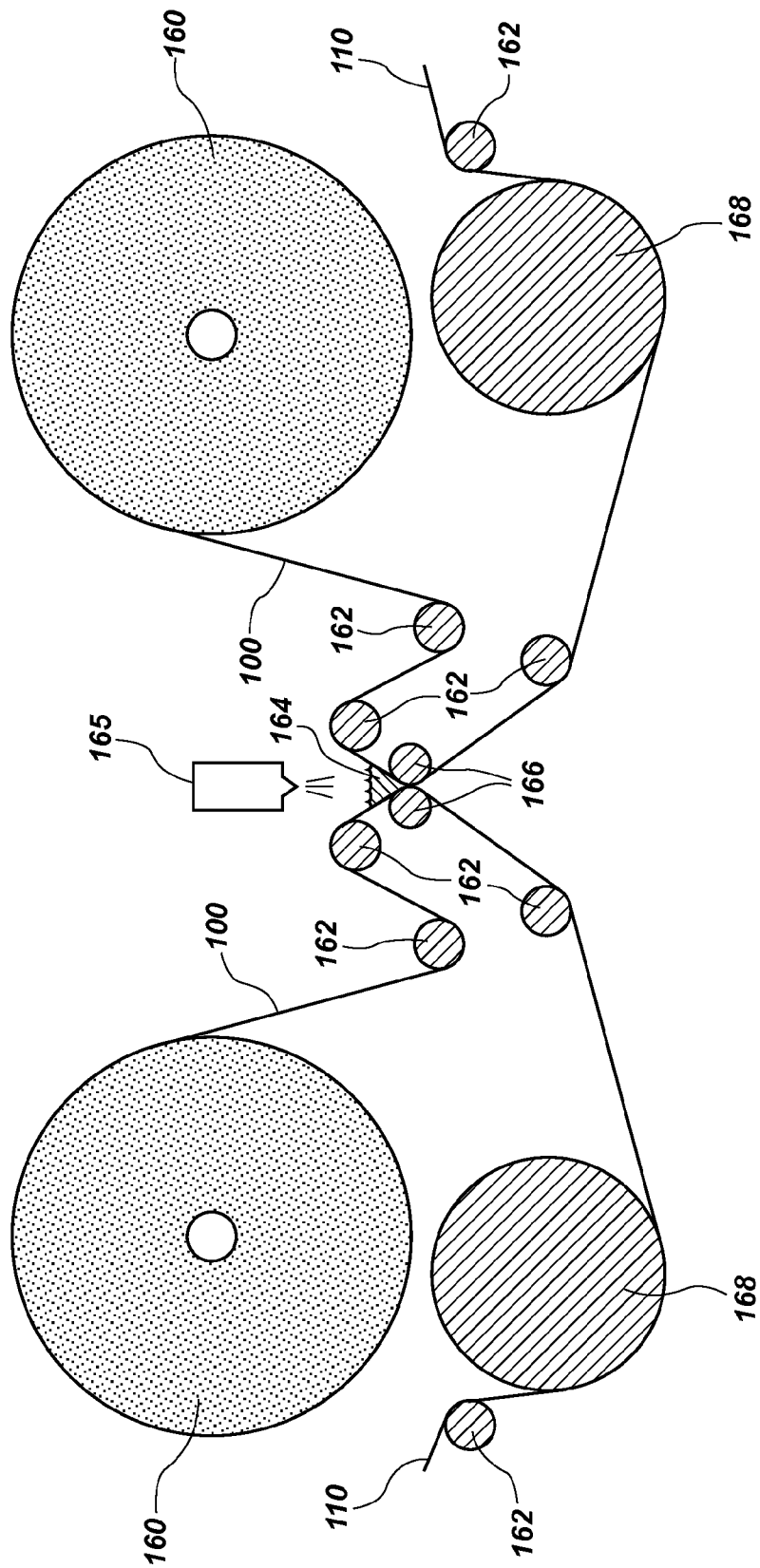
FIG. 8 is a simplified schematic diagram illustrating a process that may be performed with the machine of FIG. 7.

FIG. 7 illustrates an embodiment of machine 161 that may be adapted to form cushioning materials of the present disclosure, and FIG. 8 illustrates a corresponding method in which rollers apply a pressing force on porous foam. Note that in FIG. 7, only an outline of the cushioning material 100 is shown, so that the machine 161 is no obscured the cushioning material 100. A cushioning material 100 (such as the cushioning material 100 shown in FIG. 1) may be disposed in one or more rolls 160. FIGS. 7 and 8 show two rolls 160 of cushioning material 100, but the method may also be performed with a machine adapted to process one roll 160, three rolls 160, four rolls 160, etc. The cushioning material 100 may unroll from the rolls 160 and pass one or more tensioners 162. The tensioners 162 may apply forces on the cushioning material 100, and may keep the cushioning material 100 taut as the cushioning material 100 unrolls. The cushioning material 100 may pass adjacent (e.g., under or through) an elastomeric material. The elastomeric material may be a pool 164 of liquid elastomeric material or of elastomeric material dissolved or suspended in a solvent. In other embodiments, the elastomeric material may be sprayed onto the cushioning material 100 through one or more nozzles (not shown). In embodiments in which the cushioning material 100 passes a pool 164 of liquid elastomeric material, the pool 164 may be bounded by one or more portions of the cushioning material 100. For example, as shown in FIG. 8, two cushioning materials 100 may meet at opposing rollers 166 to form a V-shaped trough that confines the pool 164. A portion of the elastomeric material may infuse into the cushioning material 100 as the cushioning material 100 passes the elastomeric material.

The elastomeric material may be continuously, periodically, or otherwise added to the pool 164 to maintain the pool 164 at a selected level, such as through a feeding device 165. The feeding device 165 may include a distribution head that channels elastomeric material from exit points, distributing the elastomeric material in the pool 164 along the width of the cushioning material 100 entering the gap between the opposing rollers 166. For example, the feeding device 165 may have a plurality of flow valves or nozzles to allow fine tuning of the flow. The feeding device 165 may provide elastomeric material along the entire width of the cushioning material 100, or only at selected points or areas. For example, a portion at each edge of the cushioning material 100 may remain free of the elastomeric material. This may allow the elastomeric material to remain on the cushioning material 100, keeping the opposing rollers 166 and other components of the machine 161 free of the elastomeric material.

The opposing rollers 166 shown in FIGS. 7 and 8 may compress the cushioning material 100 at a pinch point, which may promote the infusion of elastomeric material into the cushioning material 100. The opposing rollers 166 may press two or more cushioning materials 100 together, but in some embodiments, a single portion of cushioning material 100 may pass between the opposing rollers 166. After passing between the opposing rollers 166, at least a portion of the elastomeric material may be within the cushioning material 100. The cushioning material 100 may pass one or more additional tensioners 162 and/or solidifers 168, forming the cushioning material 110 (such as the cushioning material 110 shown in FIG. 2). The solidifers 168 may include a device selected to promote the solidification of the elastomeric material, such as by cooling a thermoplastic, curing a thermoset, promoting evaporation in a solvated elastomer, irradiating a radiation-curable elastomer, etc. For example, a solidifer 168 may include a cooled roller, which may be configured to decrease the temperature of a molten thermoplastic elastomeric material. The cushioning material 110 may then be wound on rolls (not shown) of cushioning materials for storage, transport, further processing, and/or sale.

In some embodiments, the solidifers 168 may include a source of UV radiation. The UV radiation may shine at least partially into the cushioning material 100 to cure at least a portion of the elastomeric material therein. Some elastomeric material may not receive any radiation, and may therefore remain uncured (e.g., in a liquid state) within the cushioning material 110, or may cure over a longer period of time.

The machine 161 may also include a frame 163 having one or more support members configured to maintain the rolls 160, tensioners 162, opposing rollers 166, and/or solidifers 168 in position, or to adjust the position of one or more of the rolls 160, tensioners 162, opposing rollers 166, and/or solidifers 168. For example, the machine may include means to adjust the position of the opposing rollers 166 to change the force applied to the cushioning material 100, the size of the gap between the opposing rollers 166, etc. Adjustment means may include manual or computer-controlled devices, such as screws, slots, etc. Adjustment of the force applied to the cushioning material 100 may change the penetration speed or depth or thickness of the cell wall coating of the liquid elastomeric material.

Figure 9:
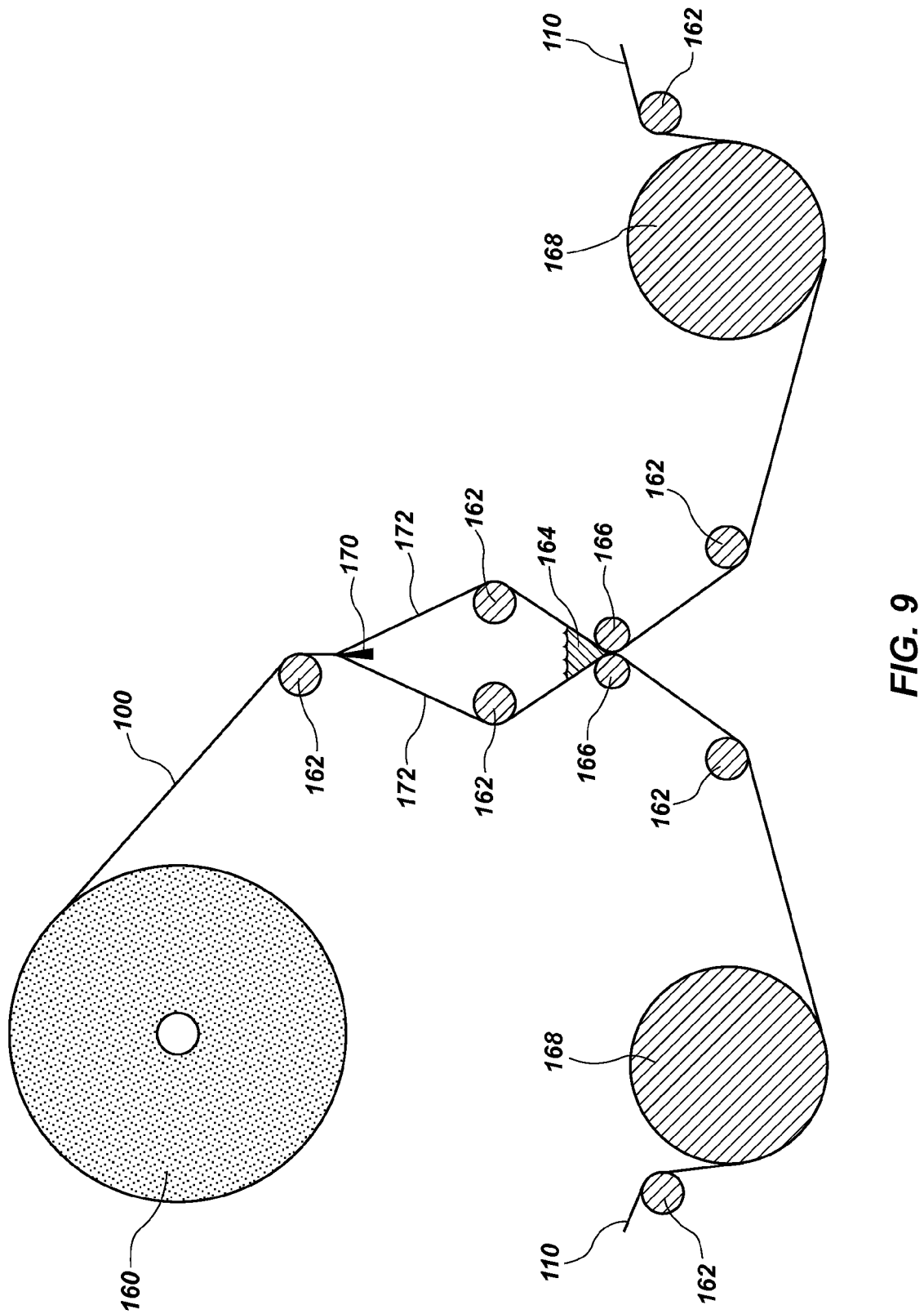
FIG. 9 is a simplified schematic diagram illustrating another process for forming open-cell flexible foam.
Figure 10:
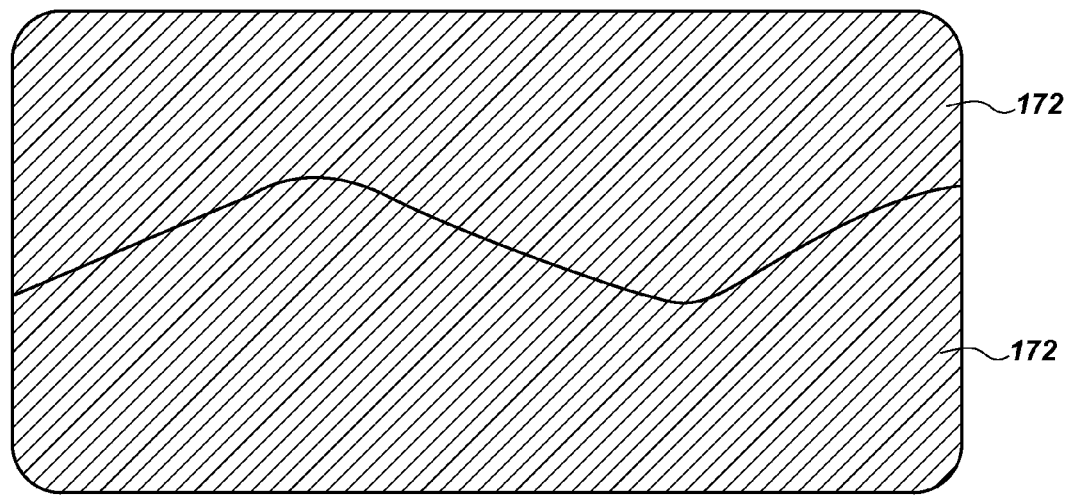
FIG. 10 is a simplified cross section of two cushions having convoluted surfaces and including open-cell flexible foam.

FIG. 9 illustrates another embodiment of a method in which rollers apply a pressing force on porous foam. A cushioning material 100 (such as the cushioning material 100 shown in FIG. 1) may be disposed in one or more rolls 160. The cushioning material 100 may unroll from the rolls 160 and pass one or more tensioners 162. The tensioners 162 may apply forces on the cushioning material 100, and may keep the cushioning material 100 taut as the cushioning material 100 unrolls. The cushioning material 100 may pass a slicer 170, which may separate the cushioning material 100 into two or more sheets of sliced cushioning material 172. The slicer 170 may be, for example, a blade, a wire, or any other means for cutting the cushioning material 100. The slicer 170 may cut the cushioning material 100 into two or more sheets of sliced cushioning material 172 having planar surfaces, convoluted surfaces, or any other surfaces. For example, to form convoluted surfaces, the slicer 170 may be disposed adjacent a pair of rollers (not shown) each having an arrangement of protrusions, wherein the protrusions each compress a portion of the cushioning material 100, such the compression of the cushioning material 100 is nonuniform. The slicer 170 may intersect the compressed cushioning material 100, and when the sliced cushioning material 172 decompresses, the sliced cushioning material 172 may have convoluted surfaces. When the sliced cushioning material 172 having convoluted surfaces rejoins, protrusions of one piece of the sliced cushioning material 172 may align with recesses of another piece of sliced cushioning material 172, as shown in FIG. 10.

The sliced cushioning material 172 may pass adjacent (e.g., under or through) an elastomeric material, such as a pool 164, as described above with respect to FIGS. 7 and 8. A portion of the elastomeric material may infuse into the sliced cushioning material 172 as the sliced cushioning material 172 passes the elastomeric material. The elastomeric material may be continuously added to the pool 164 to maintain the pool 164 at a selected level.

Opposing rollers 166 may compress the sliced cushioning material 172, and the sliced cushioning material 172 may pass one or more additional tensioners 162 and/or solidifers 168, to form the cushioning material 110 (such as the cushioning material 110 shown in FIG. 2). The cushioning material 110 may then be wound on rolls (not shown) of cushioning materials for storage, transport, further processing, and/or sale.

In some embodiments, the elastomeric material may coat cell walls through the entire thickness of the porous foam. In other embodiments, only a layer of porous foam may be coated with the elastomeric material (see FIGS. 3 through 5). For example, the coated portion 122 of the cushioning element 140 shown in FIG. 5 may have a thickness t, as described above. In embodiments in which the sliced cushioning material 172 has a convoluted surface, the resulting cushioning material 110 may be configured as the cushioning material 140 shown in FIG. 5. In other embodiments, the opposing rollers 166 may have protrusions and/or recesses, such that the elastomeric material penetrates the sliced cushioning material 172 nonuniformly. Upon relaxation of the sliced cushioning material 172, the interface between a coated portion (e.g., the coated portion 122 shown in FIG. 4) and the uncoated portion (e.g., the uncoated portion 124 shown in FIG. 4) may be convoluted.

Figure 11:
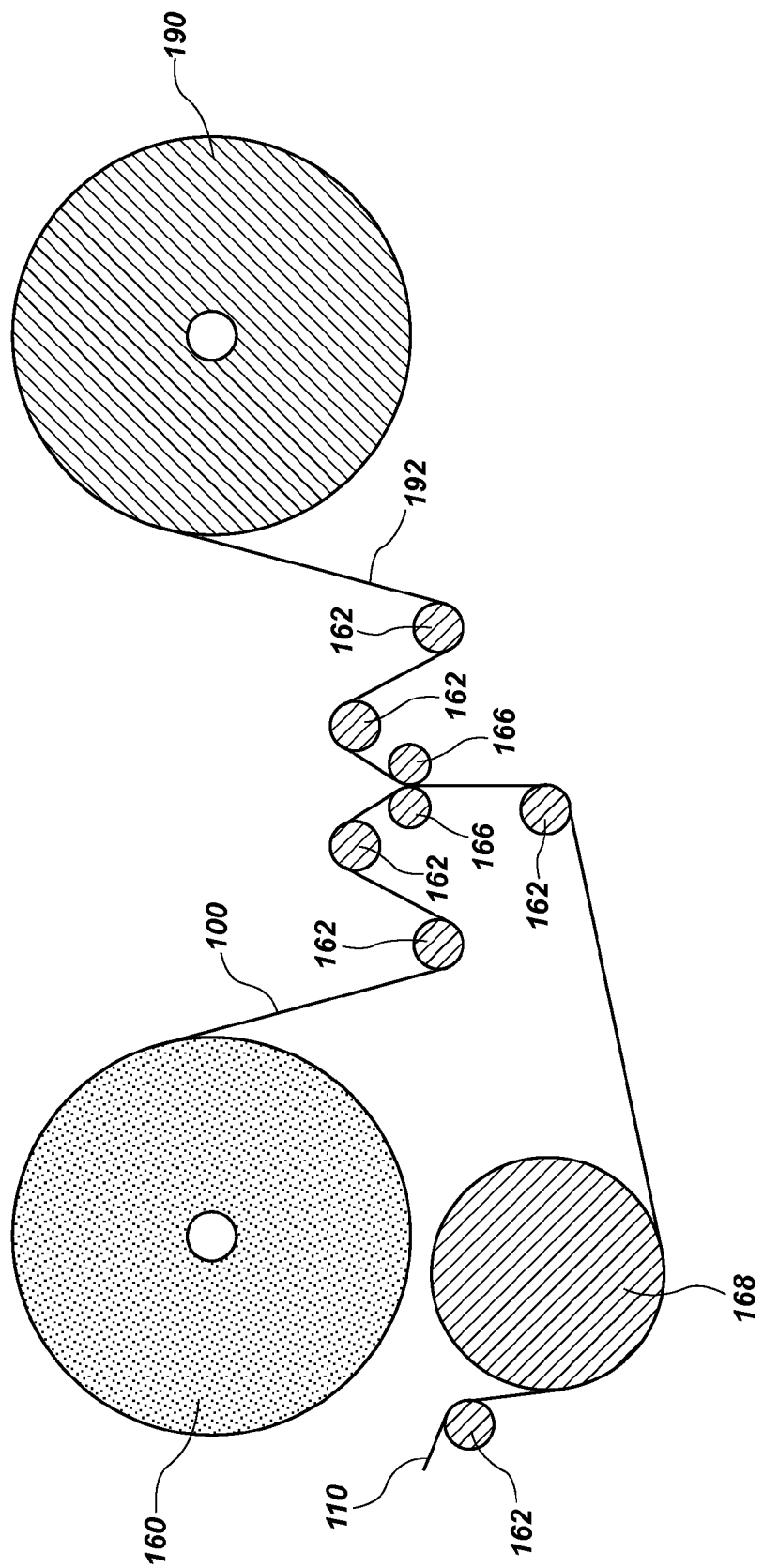

In some embodiments, and as shown in FIG. 11, an elastomeric material 192 may be provided from a roll 190. For example, a roll 190 of solid thermoplastic elastomeric material may be provided in sheet form, such as in a width corresponding to or slightly smaller than the width of the cushioning material 100 from the roll 160. The elastomeric material 192 may be unwound from the roll 190, tensioned by one or more tensioners 162, and pressed against the cushioning material 100 between opposing heated rollers 166, which serve to melt the thermoplastic elastomeric material. The opposing rollers 166 may force at least some of the molten elastomeric material 192 into voids of the cushioning material 100. The cushioning material 100 may pass one or more additional tensioners 162 and/or a solidifer 168, forming the cushioning material 110 (such as the cushioning material 110 shown in FIG. 2). The cushioning material 110 may then be wound on rolls (not shown) of cushioning materials for storage, transport, further processing, and/or sale.

In embodiments in which the opposing heated rollers 166 include protrusions and/or recesses, the opposing heated rollers 166 may cause the elastomeric material 112 to form a pattern in the cushioning material 110. For example, the elastomeric material 112 may form a decorative pattern, such as a cross-hatch pattern, a company, team, or school logo, or any other selected pattern or design. A pattern may provide marketing opportunities, and may also camouflage visual inconsistencies in the cushioning material 110.

Figure 12:
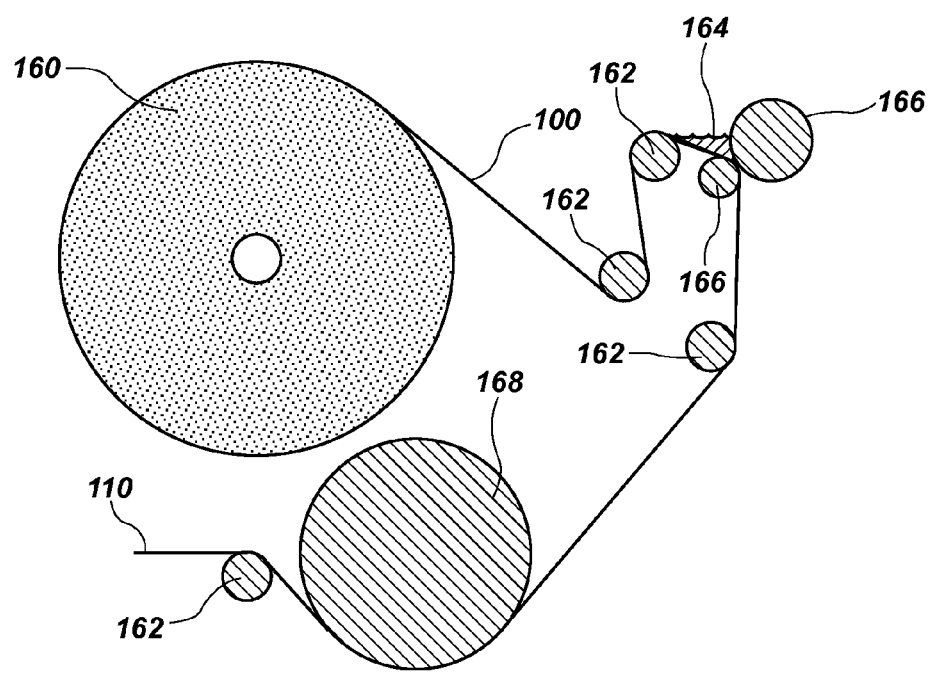
FIGS. 11 and 12 are simplified schematic diagrams illustrating additional processes for forming elastomer-coated open-cell flexible foam.

FIG. 12 illustrates an embodiment of a method in which rollers apply a pressing force on single sheet of porous foam. The process of FIG. 12 may operate similar to the process of FIG. 8, with some modifications. In particular, the pool 164 of liquid elastomeric material may be bounded by the cushioning material 100 and one of the rollers 166. The rollers 166 may be oriented and/or sized to allow a volume of the liquid elastomeric material to remain in place adjacent the rollers 166. The roller 166 in contact with the liquid elastomeric material may be configured to prevent the elastomeric material from sticking to the roller 166. For example, the roller 166 may have a coating that repels the elastomeric material.

One or more covers may be secured to the cushioning materials formed by the processes described herein. For example, covers (e.g., covers 154 in FIG. 6) may be secured over or around the cushioning materials (e.g., cushioning materials 152 in FIG. 6). The covers 154 may be secured by quilting, applying an adhesive, heat welding, or by any other method known in the art.

Cushioning elements described herein may have various benefits. For example, cushioning elements may be more durable and more resilient (e.g., less prone to permanent set or "body impressions") than conventional cushioning elements because the elastomeric material may enhance strength and/or resiliency of the open-cell structure of cushioning materials. The elastomeric material may increase comfort for a user of the cushioning elements, or may decrease resistance to shear forces, which may in turn help prevent decubitus ulcers in medical patients. Furthermore, the elastomeric material may alter the viscoelasticity of the cushioning elements, such that the cushioning elements rebound more slowly than conventional cushioning elements. Without being bound to particular theory, it is believed that a higher tackiness and/or coefficient of friction may contribute to a slow rebound.

The elastomeric material within the open-cell flexible foam may beneficially modify one or more properties of the foam (e.g., thermal mass, thermal conductivity, cushioning properties, resiliency, durability, and viscoelasticity) without eliminating the breathability of the open-cell structure. Thermal properties may be further modified by use of phase-change materials or materials having higher or lower thermal conductivities within the elastomer coating.

A cushioning element having a coating of elastomeric material penetrating as little as ⅛" (3 mm) or less into a piece of foam of any thickness may have some of the desirable properties described herein.

The cushioning materials 130 (FIG. 4) and 140 (FIG. 5) may be less susceptible to body impressions than conventional convoluted foam. For example, the flat top surface of cushioning material 130 avoids the high pressure points at the top of each peak of conventional convoluted foam because the convoluted shape of the elastomer coating occurs at a boundary 132 between the coated portion 122 and the uncoated portion 124.

In some of the methods described herein, some of the processing equipment may be isolated from liquid elastomeric material. For example, in the method shown in FIG. 8, the liquid elastomeric material may be contained primarily or entirely between two pieces of the cushioning material 100 to be coated. Thus, the rollers and other equipment may be free of the elastomeric material, simplifying maintenance and cleanup.

EXAMPLES

Example 1

A polyurethane foam having a density of about 1.8 lb/ft$^3$ and an Indentation Force Deflection (IFD) of about 32 lbs/50 in$^2$ is soaked with an elastomeric material, and the foam is compressed to remove a portion of the elastomeric material. As used herein, the term "Indentation Force Deflection (IFD)" means a force required to compress 50 in$^2$ of a 20 in by 20 in by 4 in sample by 25%, as measured in accordance with ASTM Standard D3574 (Standard Test Methods for Flexible Cellular Materials—Slab, Bonded, and Molded Urethane Foams, ASTM Int'l, West Conshohocken, Pa., 2011). The compressing force is released to allow the foam to return to its original shape. The mass of the elastomeric material removed may be greater or less than the mass of the elastomeric material not removed (i.e., retained within the foam). A coating of the elastomeric material may remain on the cell walls of the polyurethane foam, but does not completely clog all breathability of the foam (i.e., one or more gas paths remain within the foam). The foam and its elastomeric-material coating are cooled and a fabric cover is applied to the exterior of the foam, such that the assembly may be used as a cushion (e.g., a mattress, a seat cushion, a pillow, a shoe insole or midsole, etc.). A person using the cushion may experience an initial sensation of coolness when contacting the cushion. The sensation of coolness may last for a time greater than a sensation of coolness would last when using a conventional cushion, which may be due to a higher thermal mass and/or thermal conductivity of the coated foam as compared to conventional materials, including but not limited to the same foam but without the applied coating. The cushion may be more durable, resilient (less prone to permanent set or "body impressions"), and comfortable to a user than conventional cushions, including but not limited to the same foam but without the applied coating, because the gelatinous elastomer may enhance such properties of the polyurethane open-cell structure. The foam may rebound more slowly than conventional polyurethane cushioning foam, even though the original uncoated foam was a quick-rebound foam. That is, the elastomeric material may alter the viscoelasticity of the foam. Without being bound to particular theory, it is believed that the change in viscoelasticity may be due in part to the tackiness and/or coefficient of friction (drag) of the elastomeric material. Tackiness and/or drag may result in more time for deformations to reverse when a deforming force is removed. The elastomeric material may be made as described in U.S. Pat. No. 5,994,450, U.S. Pat. No. 7,964,664, and U.S. Pat. No. 4,369,284, each of which has been previously incorporated by reference. The elastomeric material may also be any other type of gelatinous elastomer. For example, the elastomeric material 112 may include a melt-blend of one part by weight of a styrene-ethylene-ethylene-propylene-styrene (SEEPS) elastomeric triblock copolymer (e.g., SEPTON® 4055, available from Kuraray America, Inc.) with eight parts by weight of a 70-weight straight-cut white paraffinic mineral oil (e.g., CARNATION® White Mineral Oil, available from Sonneborn, Inc.) and, optionally, pigments, antioxidants, and/or other additives. The cushion formed may be, for example, as shown in any of FIGS. 2 through 6.

Example 2

A polyurethane foam having a density of about 1.8 lb/ft$^3$ and an IFD of about 27 lbs/50 in$^2$ is soaked with one or more precursors which may form an elastomeric material. The foam is compressed to remove a portion of the precursors, and the compressing force is released. A coating of liquid may remain on the open cell walls of the polyurethane foam. The precursors may react to form a thermoset elastomeric material. The precursors may include one or more liquid or solid components. In some embodiments, a catalyst or cross-linker may be applied to the foam after the compressing force is released. In some embodiments, heat may be temporarily applied to assist in the reaction before or after the compressing force is applied and/or released. A liquid component may include a polyurethane gelatinous elastomer, a silicone gelatinous elastomer, or a PVC gelatinous elastomer (such as plastisol), all of which are known in the cushioning art and not described in detail herein. The coated foam may be used as a cushion (e.g., a mattress, a seat cushion, a pillow, a shoe insole or midsole, etc.). The cushion may have any or all of the benefits identified in Example 1, above.

Example 3

A viscoelastic polyurethane foam (e.g., memory foam) having a density of about 7 lb/ft$^3$ is soaked with a molten thermoplastic elastomeric material, and the foam is compressed between opposing rollers to remove a portion of the elastomeric material. A coating of the elastomeric material may remain on the open cell walls of the memory foam after the foam passes between the rollers. The foam and elastomeric material are cooled to solidify the elastomeric material and a fabric cover is applied to the exterior, such that the assembly may be used as a cushion (e.g., a shoe insole or midsole, etc.). The cushion may have any or all of the benefits identified in Example 1, above.

The elastomeric material may include phase-change microspheres (PCMs) (i.e., microspheres encapsulating a phase-change material). The elastomeric material may be as described in U.S. Pat. No. 5,994,450, U.S. Pat. No. 7,964,664, and U.S. Pat. No. 4,369,284, each of which has been previously incorporated by reference, or any other type of gelatinous elastomer. For example, the elastomeric material may include a melt-blend of one part by weight of a styrene-ethylene-butylene-styrene (SEBS) elastomeric triblock copolymer (e.g., KRATON® E1830, available from Kraton Polymers, LLC) with three parts by weight of a 90-weight straight-cut white paraffinic mineral oil (e.g., BLANDOL® White Mineral Oil, available from Sonneborn, Inc.) and, optionally, pigments, anti-oxidants, and/or other additives.

Additionally, 0.2 parts by weight of PCMs may be added (e.g., microspheres containing a material having a phase change at 28° C., currently available from Microtek Laboratories, Inc. of Dayton, Ohio). The phase change of the material within the microspheres absorbs energy, which may make a portion of the user's body (e.g., the foot) feel cooler for a longer period of time than a coating of elastomeric material without PCMs.

Example 4

A latex foam rubber having an IFD of about 19 lbs/50 in$^2$ is partially soaked with a multi-component liquid mixture having all of the ingredients necessary to form a polyurethane elastomeric material over time. The latex foam rubber is compressed between rollers so that the liquid mixture coats all or part of the open cell structure of the latex foam rubber. The latex foam rubber returns to approximately its original size and shape after passing between the rollers. A coating of the liquid mixture remains on the cell walls of the latex foam rubber. The mixture then becomes a gelatinous elastomer by reaction of two or more components of the multi-component liquid mixture. The coated latex foam rubber may be used as a cushion (e.g., the top layer of a mattress within a mattress cover, a pillow, a part of a pillow, etc.). The cushion may have any or all of the benefits identified in Example 1, above.

Example 5

A layer of 0.15-inch-thick elastomeric material (e.g., a solid thermoplastic gelatinous elastomer) may be placed atop a 2-inch-thick layer of polyurethane foam having a density of about 1.8 lb/ft$^3$ and an IFD of about 32 lbs/50 in$^2$. The elastomeric material may be as described in Example 1, above. Both layers may be pressed together and pulled through opposing heated rollers (see FIG. 11), which may melt the elastomeric material and force the elastomeric material into a portion of the foam. As the materials exit the rollers, the foam expands and the elastomeric material (which may remain at least partially molten) may coat the open cell structures in a portion of the foam but not through the entire thickness of the foam. The resulting foam having a coated portion and an uncoated portion may be, for example, as shown in FIGS. 3 through 5. A coating of elastomeric material remains on the cell walls of the polyurethane foam. The foam and the elastomeric material coating are cooled to solidify the elastomeric material and a fabric cover is applied to the exterior, such that the assembly may be used as a cushion. The cushion may have any or all of the benefits identified in Example 1, above.

Example 6

A layer of 0.15-inch-thick molten thermoplastic elastomeric material is extruded through a die and laid in its molten state atop a 2-inch-thick layer of polyurethane foam having a density of about 1.8 lb/ft$^3$ and an IFD of about 32 lbs/50 in$^2$, at 25% deflection of a 20 in by 20 in by 4 in sample. The elastomeric material may be as described Example 1, above. Both layers may be pressed together and pulled through opposing heated rollers, which may force the elastomeric material into the top portion of the foam. As the materials exit the rollers, the foam expands and the elastomeric material (which may remain at least partially molten) may coat the open cell structures in a portion of the foam but not through the entire thickness of the foam. The resulting foam having a coated portion and an uncoated portion may be, for example, as shown in FIGS. 3 through 5. A coating of elastomeric material remains on the cell walls of the polyurethane foam. The foam and the elastomeric material coating are cooled to solidify the elastomeric material, and a fabric cover is applied to the exterior, such that the assembly may be used as a cushion. The cushion may have any or all of the benefits identified in Example 1, above.

Example 7

A layer of molten elastomeric material is extruded through a die and laid in its molten state atop a 2-inch-thick layer of polyurethane foam, as described in Example 6. The molten elastomeric material has a thickness high enough that the elastomeric material coats the open cell structure through approximately the entire thickness of the foam during the pressing process.

Example 8

A layer of molten elastomeric material is extruded through a die and laid in its molten state atop a 2-inch-thick layer of polyurethane foam, as described in Example 6. The molten elastomeric material has a thickness high enough that the elastomeric material coats the open cell structure through the entire thickness of the foam during the pressing process, and some elastomeric material is removed from the foam by the rollers. The elastomeric material removed by the rollers may be recycled or disposed of.

Example 9

A polyurethane foam having a density of about 1.8 lb/ft$^3$ and an IFD of about 32 lbs/50 in$^2$ is soaked with solvated elastomeric material (i.e., an elastomeric material mixed with a solvent) and the foam is compressed between opposing rollers to remove a portion of the solvated elastomeric material. The solvated elastomeric material includes one part by weight of SEEPS elastomeric triblock copolymer (e.g., SEPTON® 4055, available from Kuraray America, Inc.), eight parts by weight of a 70-weight straight-cut white paraffinic mineral oil (e.g., CARNATION® White Mineral Oil, available from Sonneborn, Inc.), twenty parts by weight toluene, and optionally, pigments, antioxidants, and/or other additives. The mixture may be formed at room temperature or above or below room temperature. Higher temperatures may expedite the solvation, but may also evaporate solvent. Therefore, a proper mixing temperature may depend on the solubilities of components, and on the boiling point of the solvent. A coating of the solvated elastomeric material may remain on the open cell walls of the memory foam after the foam passes between the rollers. The solvent is then allowed to evaporate, which evaporation may be assisted by heat and/or vacuum, or may be unassisted at ambient conditions. Evaporation of the solvent causes the elastomeric material to solidify. If heated, the foam and elastomeric material are subsequently cooled. A fabric cover is applied to the exterior, such that the assembly may be used as a cushion (e.g., a mattress, a seat cushion, a pillow, a shoe insole or midsole, etc.). The cushion may have any or all of the benefits identified in Example 1, above.

Example 10

A formulation for forming flexible polyurethane foam is selected having a composition within the following ranges:

| Component | Parts by Weight |
| --- | --- |
| Polyol | 100 |
| Inorganic Fillers | 0-150 |
| Water | 1.5-7.5 |
| Silicone Surfactant | 0.5-2.5 |
| Amine Catalyst | 0.1-1.0 |
| Tin Catalyst | 0.0-0.5 |
| Chain-Extender | 0-10 |
| Cross-Linker | 0-5 |
| Auxiliary Blowing Agent | 0-35 |
| Isocyanate | 25-85 |

The materials are as known in the art of foam manufacture. For example, the polyol may be a polyether, a polyoxypropylene diol, a polyoxypropylene triol, etc. Inorganic fillers, if present, may include materials that affect density, load-bearing ability, etc., such as barium sulfate, calcium carbonate, etc.

One hundred parts by weight of the selected formulation are mixed with twenty parts by weight of molten elastomeric material comprising three parts SEEPS elastomeric triblock copolymer (e.g., SEPTON® 4055, available from Kuraray America, Inc.) and seventeen parts by weight of a 70-weight straight-cut white paraffinic mineral oil (e.g., CARNATION® White Mineral Oil, available from Sonneborn, Inc.). The molten elastomeric material may additionally include pigments, antioxidants, PCMs, and/or other additives. Components of the polyurethane foam react to expand and form open-cell foam during or prior to the cooling and solidification of the elastomeric material. After the elastomeric material cools and solidifies, the resulting flexible polyurethane foam is coated and/or interlaced throughout its structure with the elastomeric material. The resulting foam may have a higher "hand" (i.e., conformability to the cushioned object, person, or animal) than the polyurethane foam formulation would have had without the elastomeric material added, and may have a cooling effect on the object, person, or animal cushioned.

Example 11

A formulation for forming flexible polyurethane foam is selected having the composition as described in Example 10. One hundred parts by weight of the selected formulation are mixed with eighty parts by weight of solvated elastomeric material. The solvated elastomeric material includes five parts by weight SEEPS elastomeric triblock copolymer (e.g., SEPTON® 4055, available from Kuraray America, Inc.) and fifteen parts by weight of a 70-weight straight-cut white paraffinic mineral oil (e.g., CARNATION® White Mineral Oil, available from Sonneborn, Inc.). The solvated elastomeric material may also include one or more pigments, antioxidants, PCMs, and/or other additives. Six parts by weight of toluene is added to solvate the SEEPS elastomeric triblock copolymer and turn the mixture into a liquid at room temperature (e.g., 25° C.). The components of the polyurethane foam react to expand and form open-cell foam prior to the cooling and solidification of the elastomeric material. As the toluene evaporates and the elastomeric material solidifies, the resulting flexible polyurethane foam is coated and/or interlaced throughout its structure with the elastomeric material. The solvent is evaporated (either at room temperature or with heat applied, and optionally a vacuum) so that the elastomeric material remains on the walls of the foam. The resulting flexible polyurethane foam coated and/or interlaced throughout the structure with elastomeric material may have a higher 'hand' (conformability to the cushioned object or person or animal) than the polyurethane foam formulation would have had without the elastomeric material added, and may have a cooling effect on the object, person, or animal being cushioned.

Example 12

A polyurethane foam having a density of about 1.8 lb/ft$^3$ and an IFD of about 32 lbs/50 in$^2$ is soaked with a suspension of latex rubber particles and other ingredients such as may be reacted to make latex foam rubber or latex rubber, as known in the art of foam rubber. For example, the suspension may include sap from a rubber tree, a synthetic latex mixture, or a blend of synthetic and natural rubber particles and water. The soaked foam is compressed between rollers or by a press to remove a portion of the suspension. The compressing force is released to allow the foam to return to its original shape. A coating of the suspension may remain on the cell walls of the polyurethane foam. The coated foam is heated to cure the coating and/or remove the liquid, and a fabric cover is applied to the exterior of the coated foam, such that the assembly may be used as a cushion (e.g., a mattress, a seat cushion, a pillow, a shoe insole or a midsole, etc.). The cushion may have any or all of the benefits identified in Example 1, above. The coated foam may be more freely breathable than the coated foam in Example 1 because the removal of the liquid may leave the rubber coating thinner than the coating of elastomeric material in Example 1.

Example 13

A polyurethane foam having a density of about 1.8 lb/ft$^3$ and an IFD of about 32 lbs/50 in$^2$ is soaked with molten thermoplastic rubber, such as a styrene-ethylene-butylene-styrene (SEBS) elastomeric triblock copolymer (e.g., KRATON® G1650, available from Kraton Polymers, LLC). The foam is compressed to remove a portion of the thermoplastic rubber (which may still be molten), and the compressing force is released. A coating of thermoplastic rubber may remain on the open cell walls of the polyurethane foam. The foam and the thermoplastic rubber are cooled to solidify the elastomeric material, and a fabric cover is applied to the exterior, such that the assembly may be used as a cushion.

Example 14

A polyurethane foam having a density of about 1.8 lb/ft$^3$ and an IFD of about 32 lbs/50 in$^2$ is soaked with molten elastomeric material, such as a mixture of one part by weight of a styrene-ethylene-butylene-styrene (SEBS) elastomeric triblock copolymer (e.g., KRATON® G1651, available from Kraton Polymers, LLC) melt-blended with one part by weight polypropylene and one part by weight of a 90-weight straight-cut white paraffinic mineral oil (e.g., BLANDOL® White Mineral Oil, available from Sonneborn, Inc.) The foam is compressed between rollers or by a press to remove a portion of the molten elastomeric material. The compressing force is released to allow the foam to return to its original shape. A coating of the elastomeric material may remain on the cell walls of the polyurethane foam. The foam and the elastomeric material are cooled to solidify the elastomeric material, and a fabric cover is applied to the exterior, such that the assembly may be used as a cushion.

Example 15

A polyurethane foam having a density of about 1.8 lb/ft$^3$ and an IFD of about 32 lbs/50 in$^2$ is soaked with an elastomeric material, and the foam is compressed to remove a portion of the elastomeric material. The compressing force is released to allow the foam to return to its original shape. The elastomeric material may include, for example, the elastomeric material of Example 1, with the addition of a tackifying resin in the same weight fraction as the triblock copolymer. The tackifying resin is a hydrogenated pure monomer hydrocarbon resin, such as those commercially available from Eastman Chemical Company, of Kingsport, Tenn., under the trade name REGALREZ®. The resulting coated foam may have a slower rebound after deformation as compared to a foam without resin added to the gelatinous elastomer, such as the coated foam of Example 1.

Example 16

An elastomeric material is applied to a polyurethane foam, either as a liquid or solid, as described in the examples above. A fabric is applied (with or without a bonding or joining means) to the top and/or bottom of the foam and/or the elastomeric material. The fabric may reinforce the foam through the process of compressing the foam and the elastomeric material. The fabric may be of any type, such as woven, knit, non-woven, and mesh. The elastomeric material may pass through a mesh fabric more easily than through other fabrics. A fabric as described in this example may preserve the structural integrity of some types of foam that may not otherwise withstand some process conditions (e.g., pulling forces, temperatures, etc.).

Example 17

An elastomeric material is applied to a polyurethane foam as a liquid, as described in Example 1, above. The elastomeric material may be a liquid at room temperature, and may be designed to cure above room temperature (for example above 25° C.). The elastomeric material may be a silicone gelatinous elastomer, a PVC plastisol gelatinous elastomer, etc. For example, the elastomeric material may be a two-part polyurethane gel including an isocyanate-terminated prepolymer and a curing agent (e.g., GK-7, available from Northstar Polymers, LLC). The coated foam is heated to at least partially cure the liquid coating into a solid. A liquid elastomeric material that requires heat to begin curing may be more controllable during application to the foam than elastomeric materials that begin curing at room temperature. For example, if stopping the production line becomes necessary, the cure process of the elastomeric material may be stopped by dropping the temperature of the liquid elastomeric material (e.g., by switching off a heating element), which may have minimal negative effect on the production line. For example, the amount of liquid elastomeric material and foam wasted during a stoppage may be minimal.

Example 18

An elastomeric material is applied to a polyurethane foam as a liquid, as described in Example 1, above. The elastomeric material may be a liquid at room temperature, and may be designed to cure with the application of UV radiation. The coated foam is exposed to UV radiation to at least partially cure the liquid coating into a solid. Such a method may have benefits as described for Example 17 (e.g., the option to stop production without wasting materials or products). A cure based on UV radiation may be limited to a depth that UV radiation can penetrate. Therefore, the thickness of the foam may be selected such that UV radiation may penetrate the entire thickness of foam. In some embodiments, the foam may be thicker than the UV radiation can penetrate. Foam produced by such methods may have a "gradient cure" (i.e., a portion nearest the radiation source may be more fully cured than a portion farther from the radiation source). A foam with a gradient cure may provide a non-linear response to applied pressure.

Example 19

A layer of 0.15-inch-thick molten elastomeric material is extruded through a die and laid in its molten state atop a 2-inch-thick layer of polyurethane foam having a density of about 1.8 lb/ft$^3$ and an IFD of about 32 lbs/50 in$^2$, as described in Example 6, above. Instead of passing the foam and elastomeric material through a set of rollers, the molten elastomeric material may be infused into the foam by passing the foam and elastomeric material continuously over a vacuum table that may compress the foam and force the elastomeric material at least partially through the foam. The vacuum table may have both a bottom and side walls so that the vacuumed air may move primarily in a direction parallel to the thickness of the foam. The vacuum may act to pull the molten gelatinous elastomer through or partially through the thickness of the foam. As the materials exit the vacuum table, the foam expands and the elastomeric material (which may remain at least partially molten) may coat the open cell structures in a portion or the entirety of the foam, such as the materials shown in any of FIGS. 2 through 5. The foam and the elastomeric material coating are cooled to solidify the elastomeric material, and a fabric cover is applied to the exterior, such that the assembly may be used as a cushion. The cushion may have any or all of the benefits identified in Example 1, above.

Example 20

A layer of 0.15-inch-thick molten elastomeric material is extruded through a die and laid in its molten state atop a 2-inch-thick layer of polyurethane foam having a density of about 1.8 lb/ft$^3$ and an IFD of about 32 lbs/50 in$^2$, as described in Example 6, above. Both layers may be pressed together and pulled through opposing heated rollers having bumps or other relief, such as those used to make convoluted foam. The rollers may force the elastomeric material into the top portion of the foam or through the entire thickness of the foam.

In embodiments in which the elastomeric material penetrates only partially through the foam, the coated foam may be as shown in FIG. 4. The coated foam in such embodiments remains flat, but the portion of the foam having a coating of the elastomeric material has a convoluted shape. Such foam may have a lighter weight than a foam of the same thickness having a coating through the entire thickness of the foam. Such a foam may also be less susceptible to body impressions than regular convoluted foam, which may have high pressure points at the top of each peak of foam. In some embodiments, the elastomeric material may coat the entire thickness of the foam, and the foam may be cut into two or more pieces while compressed, forming convoluted foam having a coating of the elastomeric material. A fabric cover is applied to the exterior of the foam, such that the assembly may be used as a cushion. The cushion may have any or all of the benefits identified in Example 1, above.

Example 21

Any of the finished pieces of foam of any of Examples 1 through 19 may pass through a foam convoluting system, generally comprising one or more bumpy rollers and a slicer, resulting in one or more pieces of convoluted breathable elastomer-coated foam.

Example 22

Any of the foam materials as described in Examples 1 through 21 may pass through a quilting machine and may become part of a "quilt package" atop a mattress, futon, furniture cushion, or other product comprising a quilt or a quilted layer.

Example 23

Two 300-foot-long, 8-foot-wide rolls of mattress quilting foam are unrolled and come together between two rollers as shown in FIGS. 7 and 8, forming a "V" upon entry. A pool or puddle of liquid elastomeric material is applied to the base of the V and continuously refreshed with new liquid elastomeric material, soaking through the surface of each piece of foam before it passes between the rollers. As the two pieces of adjacent foam exit the rollers, the foam re-expands, opening the open-cell structure and leaving a coating of elastomeric material on the interior cell walls. The foam is allowed to cool at ambient conditions, or may be quick-cooled by running the foam across a cool surface or blowing cool air onto or through the foam with its breathable elastomer coating. The foam may be used or may be rerolled for convenient storage or shipping, and the rolling process may include compression of the foam to reduce volume in storage or shipping. More than two pieces of foam may be coated simultaneously, with multiple liquid elastomer pools (one pool between each adjacent piece). The liquid elastomeric material may be pooled from edge to edge of each foam piece, or the pool may be terminated short of the edges to make the process cleaner and to protect the equipment.

An example formulation of molten elastomeric material may include one part by weight of SEEPS elastomeric triblock copolymer (e.g., SEPTON® 4055, available from Kuraray America, Inc.), nine parts by weight of a 70-weight straight-cut white paraffinic mineral oil (e.g., CARNATION® White Mineral Oil, available from Sonneborn, Inc.), and, optionally, antioxidants, pigments, and/or fillers. Fillers may include, for example, phase change microspheres to enhance cooling, hollow microspheres to lower weight and retard the cooling effect, particulate matter to lower material costs, resins to add tackiness, flame retardants, viscosity modifiers, slip agents, etc. A high plasticizer-to-polymer ratio may result in low viscosity of the molten elastomeric material, thus enabling the process to be conducted rapidly. Foam may be processed at speeds of about one foot per second to produce uniformly thick penetrations into the foam. Higher or lower speeds may also be selected, based on properties of the foam, the elastomeric material, and on process conditions (e.g., temperature, width of gap between rollers, etc.) The depth of penetration of the elastomer into the foam may vary based on processing speed, viscosity of the elastomeric material, distance between rollers, foam thickness, foam density, foam cell size, etc.

For thermoplastic elastomers, one example of a means to continually refresh the pool at the base of the "V" is to process raw materials through an extruder. The extruder melts and blends the ingredients, and pumps the melted elastomeric material into the pool. A distribution head may channel elastomeric material from numerous exit points, distributing the elastomeric material in the pool along the width of the two pieces of foam entering the gap between the rollers. The distribution head may have a plurality of flow valves to allow fine tuning of the distribution. Each exit point may comprise a flow-controllable valve or nozzle to further fine tune the distribution.

Convoluted foam may be coated with elastomeric material by this method; the protrusions and recesses of the convoluted foam may line up as the two pieces of foam come together, but such alignment is not necessary. FIG. 10 shows an example of protrusions and recesses of adjacent convoluted foam materials that are aligned. In embodiments in which two sliced cushioning materials 172 (e.g., orthopedically shaped pillows) come together between rollers, the protrusions of one piece may be aligned with the recesses of the adjacent cushioning material 172, as shown in FIG. 10. Single pairs of cushioning material may be produced in this fashion, or multiple cushioning materials may be produced from continuous pieces of such foam by cutting the cushioning materials after coating. To coat the sliced cushioning materials 172 of FIG. 10 in the process shown in FIGS. 7 and 8, the cushioning materials may be oriented 90° from the angle shown before entering the gap between the rollers 166 so that gravity may be used to keep the pool of liquid elastomeric material in place.

Example 24

A single piece of foam (e.g., mattress quilting foam, carpet pad, etc.) may pass between rollers, with liquid elastomer (e.g., molten thermoplastic gel or freshly mixed multi-component thermoset gel) applied to the piece before the piece passes between the rollers. For example, the process may occur as shown in FIG. 12. The foam piece and the upper roller may form a "V" into which the elastomeric material is pooled. Such a process may be used for discrete pieces of foam (e.g., rolls of foam), but may also be used in-line with a process forming foam continuously, (e.g., a continuous foam blowing line). This may be especially useful for materials conventionally formed in a continuous process (e.g., carpet padding, latex foam rubber, etc.).

Example 25

A roll of foam is unrolled and sliced. The foam may be sliced to form convoluted surfaces, such as by passing the foam over a pair of rollers before slicing, each roller having an arrangement of protrusions. The sliced foam rejoins between two rollers as shown in FIG. 9, forming a "V" upon entry. A pool or puddle of liquid elastomeric material is applied to the base of the V and continuously refreshed with new liquid elastomeric material, soaking through the surface of each piece of foam before it passes between the rollers, as described in Example 23. The interior cell walls of the foam may be partially or fully coated in the process. As the two pieces of adjacent foam exit the rollers, the foam reexpands, reopening the open-cell structure and leaving a coating of elastomeric material on the interior cell walls. More than two pieces of foam may be sliced and/or coated simultaneously, with multiple liquid elastomer pools (e.g., one pool between each pair of adjacent pieces). Integrating the slicing of foam into two or more portions into the process may help align protrusions in one piece of convoluted foam with the recesses in another piece of convoluted foam, which may make the depth of penetration of the elastomer more uniform. Integration of the slicer may also increase economy as compared with separately convoluting the foam, by limiting the processing steps and handling required.

Additional non-limiting example embodiments of the disclosure are described below.

Embodiment 1: A cushioning element comprising a breathable porous foam comprising a series of interconnected cell walls and defining an open pore network, and an elastomeric material formed over at least a portion of the interconnected cell walls. The elastomeric material includes an elastomeric polymer and a plasticizer. A ratio of a weight of the plasticizer to a weight of the elastomeric polymer is from about 0.1 to about 50. The breathable porous foam is configured to allow gases to pass through at least a portion of the open pore network adjacent the elastomeric material.

Embodiment 2: The cushioning element of Embodiment 1, wherein the breathable porous foam comprises a polyurethane or latex rubber.

Embodiment 3: The cushioning element of Embodiment 1 or Embodiment 2, wherein the elastomeric material comprises a material selected from the group consisting of a gelatinous elastomer, a thermoplastic elastomer, rubber, a synthetic elastomer, and combinations thereof.

Embodiment 4: The cushioning element of any of Embodiments 1 through 3, further comprising a cover disposed over the breathable porous foam.

Embodiment 5: The cushioning element of any of Embodiments 1 through Embodiment 4, wherein the elastomeric material further comprises a plurality of microspheres.

Embodiment 6: The cushioning element of Embodiment 5, wherein the plurality of microspheres comprises a material having a melting point from about 20° C. to about 45° C.

Embodiment 7: The cushioning element of Embodiment 5 or Embodiment 6, wherein the plurality of microspheres comprises a plurality of hollow microspheres.

Embodiment 8: The cushioning element of any of Embodiments 1 through 7, wherein a first portion of the elastomeric material is in a solid state and a second portion of the elastomeric material is in a liquid state.

Embodiment 9: The cushioning element of any of Embodiments 1 through 8, further comprising an interface between a coated portion of the breathable porous foam and an uncoated portion of the breathable porous foam, wherein the interface between the coated portion of the breathable porous foam and the uncoated portion of the breathable porous foam defines a convoluted surface.

Embodiment 10: The cushioning element of any of Embodiments 1 through 8, further comprising an interface between a coated portion of the breathable porous foam and an uncoated portion of the breathable porous foam, wherein the interface between the coated portion of the breathable porous foam and the uncoated portion of the breathable porous foam defines a planar surface.

Embodiment 11: The cushioning element of any of Embodiments 1 through 10, wherein the breathable porous foam is quilted to another material.

Embodiment 12: The cushioning element of any of Embodiments 1 through 11, wherein the elastomeric polymer comprises an A-B-A triblock copolymer.

Embodiment 13: A method of forming a cushioning element, comprising coating interconnected cell walls of a breathable porous foam with a liquid comprising an elastomeric material, solidifying at least a portion of the elastomeric material, and providing a gas path through the elastomeric material. The interconnected cell walls form an open pore network configured to allow gases to flow therethrough. The elastomeric material is adjacent the open pore network of the breathable porous foam.

Embodiment 14: The method of Embodiment 13, wherein coating interconnected cell walls of a breathable porous foam with a liquid comprising an elastomeric material comprises forming a foam precursor, mixing the liquid comprising an elastomeric material with the foam precursor, and forming the interconnected cell walls from the foam precursor.

Embodiment 15: The method of Embodiment 13, wherein coating interconnected cell walls of a breathable porous foam with a liquid comprising an elastomeric material comprises coating preformed interconnected cell walls with the elastomeric material.

Embodiment 16: The method of any of Embodiments 13 through 15, wherein coating interconnected cell walls of a breathable porous foam with a liquid comprising an elastomeric material comprises disposing the liquid comprising an elastomeric material within pores defined by the interconnected cell walls, and removing a portion of the liquid comprising an elastomeric material from the pores.

Embodiment 17: The method of Embodiment 16, wherein removing a portion of the liquid comprising an elastomeric material from the pores comprises compressing the porous foam.

Embodiment 18: The method of Embodiment 17, wherein compressing the porous foam comprises passing the porous foam over at least one roller.

Embodiment 19: The method of any of Embodiments 13 through 18, wherein coating interconnected cell walls of a breathable porous foam with a liquid comprising an elastomeric material comprises coating the interconnected cell walls with a mixture comprising a solvent and the elastomeric material, and removing at least a portion of the solvent from the mixture.

Embodiment 20: The method of Embodiment 19, wherein removing at least a portion of the solvent from the interconnected cell walls comprises evaporating at least a portion of the solvent.

Embodiment 21: The method of any of Embodiments 13 through 20, wherein coating interconnected cell walls of a breathable porous foam with a liquid comprising an elastomeric material comprises coating the interconnected cell walls with an A-B-A triblock copolymer.

Embodiment 22: The method of any of Embodiments 13 through 21, further comprising quilting at least a portion of the breathable porous foam to another material.

Embodiment 23: The method of any of Embodiments 13 through 22, wherein coating interconnected cell walls of a breathable porous foam with a liquid comprising an elastomeric material comprises coating the interconnected cell walls of a breathable porous foam with an elastomeric material comprising an elastomeric polymer and a plasticizer, wherein a ratio of a weight of the plasticizer to a weight of the elastomeric polymer is from about 0.1 to about 50.

Embodiment 24: The method of any of Embodiments 13 through 23, wherein solidifying at least a portion of the elastomeric material comprises exposing at least a portion of the elastomeric material to UV radiation.

Embodiment 25: The method of any of Embodiments 13 through 24, wherein solidifying at least a portion of the elastomeric material comprises heating at least a portion of the elastomeric material.

Embodiment 26: The method of Embodiment 25 wherein solidifying at least a portion of the elastomeric material further comprises cooling at least a portion of the elastomeric material.

Embodiment 27: The method of any of Embodiments 13 through 26, wherein coating interconnected cell walls of a breathable porous foam with a liquid comprising an elastomeric material comprises disposing the liquid comprising the elastomeric material adjacent the breathable porous foam, compressing the liquid comprising the elastomeric material and the breathable porous foam, and infusing the liquid comprising the elastomeric material into pores of the breathable porous foam.

Embodiment 28: The method of Embodiment 27, wherein disposing the liquid comprising the elastomeric material adjacent the breathable porous foam comprises disposing a liquid elastomeric material over the porous foam.

Embodiment 29: The method of Embodiment 28, wherein compressing the liquid comprising the elastomeric material and the breathable porous foam comprises passing the liquid comprising the elastomeric material and the breathable porous foam adjacent at least one roller.

Embodiment 30: The method of any of Embodiments 27 through 29, wherein coating interconnected cell walls of a breathable porous foam with a liquid comprising an elastomeric material further comprises unrolling the breathable porous foam from a roll of breathable porous foam.

Embodiment 31: The method of Embodiment 30, wherein disposing the liquid comprising the elastomeric material over the breathable porous foam comprises passing the breathable porous foam under the liquid comprising the elastomeric material and covering a surface of the breathable porous foam with the liquid comprising the elastomeric material.

Embodiment 32: The method of Embodiment 31, wherein compressing the liquid comprising the elastomeric material and the breathable porous foam comprises pressing at least two pieces of the breathable porous foam together between at least two rollers, wherein the liquid comprising an elastomeric material is disposed in the interior of the at least two pieces of the breathable porous foam.

Embodiment 33: The method of Embodiment 32, wherein pressing at least two pieces of the breathable porous foam together between at least two rollers comprises pressing the at least two pieces of the breathable porous foam together between at least two rollers comprising at least one of recesses and protrusions forming a pattern.

Embodiment 34: The method of Embodiment 32, further comprising slicing the breathable porous foam and forming the at least two pieces of the breathable porous foam, separating the at least two pieces of the breathable porous foam, and rejoining the at least two pieces of the breathable porous foam after passing the breathable porous foam under the liquid comprising the elastomeric material and covering a surface of the breathable porous foam with the liquid comprising the elastomeric material. Each piece of breathable porous foam has a convoluted surface defining a plurality of recesses and protrusions.

Embodiment 35: A method of forming a cushioning element comprising pressing two sheets of breathable porous foam together at a pinch point, disposing a liquid between the two sheets of breathable porous foam over the pinch point, coating at least a portion of each of the two sheets of breathable porous foam with the liquid, and separating the two sheets of breathable porous foam beyond the pinch point.

Embodiment 36: A method of forming a cushioning element comprising coating interconnected cell walls of each of a plurality of portions of porous foam with an elastomeric material, consolidating the plurality of portions of porous foam into a continuous cushioning material, and providing a gas path through the plurality of portions of porous foam. The elastomeric material includes an elastomeric polymer and a plasticizer. A ratio of a weight of the plasticizer to a weight of the elastomeric polymer is from about 0.1 to about 50.

Embodiments of the disclosure are susceptible to various modifications and alternative forms. Specific embodiments have been shown in the drawings and described in detail herein to provide illustrative examples of embodiments of the disclosure. However, the disclosure is not limited to the particular forms disclosed herein. Rather, embodiments of the disclosure may include all modifications, equivalents, and alternatives falling within the scope of the disclosure as broadly defined herein. Furthermore, elements and features described herein in relation to some embodiments may be implemented in other embodiments of the disclosure, and may be combined with elements and features described herein in relation to other embodiments to provide yet further embodiments of the disclosure.

What is claimed is:

1. A cushioning element, comprising:
a breathable porous foam comprising a series of interconnected cell walls and defining an open pore network; and
an elastomeric material formed over at least a portion of the interconnected cell walls, the elastomeric material comprising an elastomeric polymer and a plasticizer, wherein the elastomeric polymer comprises an A-B-A triblock copolymer, and wherein a ratio of a weight of the plasticizer to a weight of the elastomeric polymer is from about 0.1 to about 50;
wherein the breathable porous foam has a portion uncoated with the elastomeric material; and
wherein the coated breathable porous foam allows gases to pass through at least a portion of the open pore network adjacent the elastomeric material, and wherein the elastomeric material further comprises a material selected from the group consisting of a gelatinous elastomer, a thermoplastic elastomer, rubber, a synthetic elastomer, and combinations thereof.

2. The cushioning element of claim 1, wherein the breathable porous foam comprises a polyurethane or latex rubber.

3. The cushioning element of claim 1, wherein the elastomeric material further comprises a plurality of microspheres.

4. The cushioning element of claim 3, wherein the plurality of microspheres comprises a material having a melting point from about 20° C. to about 45° C.

5. The cushioning element of claim 3, wherein the plurality of microspheres comprises a plurality of hollow microspheres.

6. The cushioning element of claim 1, further comprising an interface between a coated portion of the breathable porous foam and an uncoated portion of the breathable porous foam, wherein the interface between the coated portion of the breathable porous foam and the uncoated portion of the breathable porous foam defines a convoluted surface.

7. The cushioning element of claim 1, further comprising an interface between a coated portion of the breathable porous foam and an uncoated portion of the breathable porous foam, wherein the interface between the coated portion of the breathable porous foam and the uncoated portion of the breathable porous foam defines a planar surface.

8. The cushioning element of claim 1, wherein the breathable porous foam is quilted to another material.

9. A method of forming a cushioning element, comprising:
coating a portion of interconnected cell walls of a breathable porous foam with a liquid comprising an elastomeric material, the coated interconnected cell walls forming an open pore network that allows gases to flow therethrough, wherein coating interconnected cell walls of a breathable porous foam with a liquid comprising an elastomeric material comprises:
disposing the liquid comprising an elastomeric material within pores defined by the interconnected cell walls, wherein the elastomeric material comprises an elastomeric polymer and a plasticizer, wherein the elastomeric polymer comprises an A-B-A triblock copolymer, wherein the elastomeric material further comprises a material selected from the group consisting of a gelatinous elastomer, a thermoplastic elastomer, rubber, a synthetic elastomer, and combinations thereof, and wherein a ratio of a weight of the plasticizer to a weight of the elastomeric polymer is from about 0.1 to about 50;

removing a portion of the liquid comprising the elastomeric material from the pores;

leaving a portion of the breathable porous foam uncoated with the elastomeric material;

solidifying at least a portion of the elastomeric material; and providing a gas path through the elastomeric material, the elastomeric material adjacent the open pore network of the breathable porous foam.

10. The method of claim 9, wherein coating interconnected cell walls of a breathable porous foam with a liquid comprising an elastomeric material further comprises:

forming a foam precursor;

mixing the liquid comprising an elastomeric material with the foam precursor; and forming the interconnected cell walls from the foam precursor.

11. The method of claim 9, wherein removing a portion of the liquid comprising an elastomeric material from the pores comprises compressing and releasing the porous foam prior to solidifying at least a portion of the elastomeric material.

12. The method of claim 9, wherein coating interconnected cell walls of a breathable porous foam with a liquid comprising an elastomeric material further comprises:

coating the interconnected cell walls with a mixture comprising a solvent and the elastomeric material; and removing at least a portion of the solvent from the mixture.

13. The method of claim 9, further comprising quilting at least a portion of the breathable porous foam to another material.

14. The method of claim 9, wherein solidifying at least a portion of the elastomeric material comprises exposing at least a portion of the elastomeric material to UV radiation.

15. The method of claim 9, wherein solidifying at least a portion of the elastomeric material comprises heating at least a portion of the elastomeric material.

16. The method of claim 9, wherein solidifying at least a portion of the elastomeric material further comprises cooling at least a portion of the elastomeric material.

17. The method of claim 9, wherein coating interconnected cell walls of a breathable porous foam with a liquid comprising an elastomeric material further comprises:

disposing the liquid comprising the elastomeric material adjacent the breathable porous foam;

compressing the liquid comprising the elastomeric material and the breathable porous foam; and infusing the liquid comprising the elastomeric material into pores of the breathable porous foam.

18. The method of claim 17, wherein disposing the liquid comprising the elastomeric material adjacent the breathable porous foam comprises disposing a liquid elastomeric material over the porous foam.

19. The method of claim 18, wherein compressing the liquid comprising the elastomeric material and the breathable porous foam comprises passing the liquid comprising the elastomeric material and the breathable porous foam adjacent at least one roller.

20. The method of claim 17, wherein:

coating interconnected cell walls of a breathable porous foam with a liquid comprising an elastomeric material further comprises unrolling the breathable porous foam from a roll of breathable porous foam; and disposing the liquid comprising the elastomeric material over the breathable porous foam comprises passing the breathable porous foam under the liquid comprising the elastomeric material and covering a surface of the breathable porous foam with the liquid comprising the elastomeric material.

21. The method of claim 20, wherein compressing the liquid comprising the elastomeric material and the breathable porous foam comprises pressing at least two pieces of the breathable porous foam together between at least two rollers, wherein the liquid comprising an elastomeric material is disposed in the interior of the at least two pieces of the breathable porous foam.

22. The method of claim 21, wherein pressing at least two pieces of the breathable porous foam together between at least two rollers comprises pressing the at least two pieces of the breathable porous foam together between at least two rollers comprising at least one of recesses and protrusions forming a pattern.

23. The method of claim 21, further comprising:

slicing the breathable porous foam and forming the at least two pieces of the breathable porous foam, each piece having a convoluted surface defining a plurality of recesses and protrusions;

separating the at least two pieces of the breathable porous foam; and rejoining the at least two pieces of the breathable porous foam after passing the breathable porous foam under the liquid comprising the elastomeric material and covering a surface of the breathable porous foam with the liquid comprising the elastomeric material.

* * * * *